(12) United States Patent
Avedon

(10) Patent No.: US 10,024,531 B2
(45) Date of Patent: Jul. 17, 2018

(54) COLUMNAR AIR MOVING DEVICES, SYSTEMS AND METHODS

(71) Applicant: AIRIUS IP HOLDINGS, LLC, Longmont, CO (US)

(72) Inventor: Raymond B. Avedon, Boulder, CO (US)

(73) Assignee: Airius IP Holdings, LLC, Longmont, CO (US)

(*) Notice: Subject to any disclaimer, the term of this patent is extended or adjusted under 35 U.S.C. 154(b) by 881 days.

(21) Appl. No.: 14/575,626

(22) Filed: Dec. 18, 2014

(65) Prior Publication Data

US 2015/0176834 A1 Jun. 25, 2015

Related U.S. Application Data

(60) Provisional application No. 61/918,563, filed on Dec. 19, 2013.

(51) Int. Cl.
| | |
|---|---|
| F04D 25/08 | (2006.01) |
| F21V 33/00 | (2006.01) |
| F04D 29/54 | (2006.01) |
| F21V 29/67 | (2015.01) |
| F21V 29/83 | (2015.01) |

(Continued)

(52) U.S. Cl.
CPC ........ *F21V 33/0096* (2013.01); *F04D 25/088* (2013.01); *F04D 29/545* (2013.01); *F21V 29/677* (2015.01); *F21V 29/83* (2015.01); *F21S 2/00* (2013.01); *F21V 21/30* (2013.01); *F21W 2131/10* (2013.01); *F21Y 2115/10* (2016.08)

(58) Field of Classification Search
CPC .... F21V 33/0096; F21V 29/83; F21V 29/677; F21V 21/30; F04D 25/088; F04D 29/545; F04D 19/002; F04D 25/08; F04D 29/58; F04D 29/582; F04D 29/5826; F04D 29/5833; F21Y 2115/10; F21S 2/00; F21W 2131/10
See application file for complete search history.

(56) References Cited

U.S. PATENT DOCUMENTS

| | | |
|---|---|---|
| 866,292 A | 9/1907 | Meston |
| 917,206 A | 4/1909 | Watts |

(Continued)

FOREIGN PATENT DOCUMENTS

| | | |
|---|---|---|
| AU | 2013203632 | 11/2016 |
| CN | 1426729 | 7/2003 |

(Continued)

OTHER PUBLICATIONS

"The New Airius Q50 EC", https://web.archive.org/web/20150721185407/http://airius.com.au/technical/specification-sheets/the-new-airius-g50-ec/ as archived Jul. 21, 2015, pp. 2.

(Continued)

*Primary Examiner* — Richard Edgar
(74) *Attorney, Agent, or Firm* — Knobbe Martens Olson & Bear LLP

(57) ABSTRACT

An air moving device includes a housing member, a rotary fan assembly, and a nozzle. The air moving device further includes a light source member mounted within the nozzle. The light source member can be placed within a flow of air moving out the end of the nozzle in a generally columnar pattern. The flow of air can be used to cool the light source member.

20 Claims, 18 Drawing Sheets

(51) Int. Cl.
*F21S 2/00* (2016.01)
*F21V 21/30* (2006.01)
*F21W 131/10* (2006.01)
*F21Y 115/10* (2016.01)

(56) References Cited

U.S. PATENT DOCUMENTS

| | | |
|---|---|---|
| 1,858,067 A | 5/1932 | Warren |
| 1,877,347 A | 9/1932 | McCurdie |
| 1,926,795 A | 9/1933 | Sassenberg |
| 2,016,778 A | 10/1935 | Hall et al. |
| 2,142,307 A | 1/1939 | De Mey et al. |
| 2,144,035 A | 1/1939 | Smith, Jr. |
| 2,154,313 A | 4/1939 | McMahan |
| 2,189,008 A | 2/1940 | Kurth |
| 2,189,502 A | 2/1940 | Johnston |
| 2,232,573 A | 2/1941 | Teves |
| 2,258,731 A | 10/1941 | Blumenthal |
| D133,120 S | 7/1942 | Spear |
| 2,359,021 A | 9/1944 | Campbell et al. |
| 2,366,773 A | 1/1945 | Eklund et al. |
| 2,371,821 A | 3/1945 | Havis |
| D152,397 S | 1/1949 | Damond |
| 2,513,463 A | 7/1950 | Eklund et al. |
| 2,524,974 A | 10/1950 | Hickmott |
| 2,615,620 A | 10/1952 | Goettl |
| 2,632,375 A | 3/1953 | Stair et al. |
| 2,658,719 A | 11/1953 | Johanson |
| D174,230 S | 3/1955 | Lewis, II |
| 2,814,433 A | 11/1957 | Brinen |
| 2,830,523 A | 4/1958 | Vehige |
| D187,699 S | 4/1960 | van Rijn |
| 2,982,198 A | 5/1961 | Mohrman |
| 3,012,494 A | 12/1961 | Drummond |
| 3,036,509 A | 5/1962 | Babbitt |
| 3,068,341 A | 12/1962 | Ortiz et al. |
| 3,072,321 A | 1/1963 | King, Jr. |
| D195,287 S | 5/1963 | Downing |
| 3,099,949 A | 8/1963 | Davidson |
| 3,165,294 A | 1/1965 | Anderson |
| 3,188,007 A | 6/1965 | Myklebust |
| 3,212,425 A | 10/1965 | Lindner et al. |
| 3,246,699 A | 4/1966 | Jocz |
| 3,300,123 A | 1/1967 | Freyholdt et al. |
| 3,320,869 A | 5/1967 | Schach |
| 3,364,839 A | 1/1968 | Sweeney et al. |
| 3,382,791 A | 5/1968 | Henry-Biabaud |
| 3,386,368 A | 6/1968 | Fielding |
| 3,413,905 A | 12/1968 | Johnson |
| 3,524,399 A | 8/1970 | Bohanon |
| 3,584,968 A | 6/1971 | Keith |
| 3,601,184 A | 8/1971 | Hauville |
| 3,690,244 A | 9/1972 | Kallel et al. |
| 3,699,872 A | 10/1972 | Kruger |
| 3,765,317 A | 10/1973 | Lowe |
| 3,785,271 A | 1/1974 | Joy |
| 3,827,342 A | 8/1974 | Hughes |
| 3,835,759 A | 9/1974 | Lloyd |
| 3,876,331 A | 4/1975 | DenHerder et al. |
| 3,927,300 A | 12/1975 | Wada et al. |
| 3,932,054 A | 1/1976 | McKelvey |
| 3,934,494 A | 1/1976 | Butler |
| 3,967,927 A | 7/1976 | Patterson |
| 3,973,479 A | 8/1976 | Whiteley |
| 3,988,973 A | 11/1976 | Honmann |
| 4,006,673 A | 2/1977 | Meyer et al. |
| 4,064,427 A | 12/1977 | Hansen et al. |
| 4,123,197 A | 10/1978 | Keem et al. |
| D251,851 S | 5/1979 | Palm |
| 4,152,973 A | 5/1979 | Peterson |
| 4,185,545 A | 1/1980 | Rusth et al. |
| D255,488 S | 6/1980 | Kanarek |
| D256,273 S | 8/1980 | Townsend et al. |
| 4,261,255 A | 4/1981 | Anderson et al. |
| 4,321,659 A | 3/1982 | Wheeler |
| 4,344,112 A | 8/1982 | Brown |
| 4,396,352 A | 8/1983 | Pearce |
| 4,473,000 A | 9/1984 | Perkins |
| 4,512,242 A | 4/1985 | Bohanon, Sr. |
| 4,515,538 A | 5/1985 | Shih |
| 4,522,255 A | 6/1985 | Baker |
| 4,524,679 A | 6/1985 | Lyons |
| 4,546,420 A | 10/1985 | Wheeler et al. |
| 4,548,548 A | 10/1985 | Gray, III |
| 4,550,649 A | 11/1985 | Zambolin |
| 4,630,182 A | 12/1986 | Moroi et al. |
| 4,657,483 A | 4/1987 | Bede |
| 4,662,912 A | 5/1987 | Perkins |
| 4,678,410 A | 7/1987 | Kullen |
| 4,681,024 A | 7/1987 | Ivey |
| 4,692,091 A | 9/1987 | Ritenour |
| 4,715,784 A | 12/1987 | Mosiewicz |
| 4,716,818 A | 1/1988 | Brown |
| 4,730,551 A | 3/1988 | Peludat |
| 4,790,863 A | 12/1988 | Nobiraki et al. |
| 4,794,851 A | 1/1989 | Kurrle |
| 4,796,343 A | 1/1989 | Wing |
| 4,848,669 A | 7/1989 | George |
| 4,850,265 A | 7/1989 | Raisanen |
| 4,890,547 A | 1/1990 | Wagner et al. |
| 4,895,065 A | 1/1990 | Lamparter |
| D308,416 S | 6/1990 | Brumbach |
| 4,930,987 A | 6/1990 | Stahl |
| 4,971,143 A | 11/1990 | Hogan |
| 4,973,016 A | 11/1990 | Hertenstein |
| 5,000,081 A | 3/1991 | Gilmer |
| 5,021,932 A | 6/1991 | Ivey |
| 5,033,711 A | 7/1991 | Gregorich et al. |
| 5,042,366 A | 8/1991 | Panetski et al. |
| 5,078,574 A | 1/1992 | Olsen |
| 5,094,676 A | 3/1992 | Karbacher |
| D325,628 S | 4/1992 | Cho |
| 5,107,755 A | 4/1992 | Leban et al. |
| 5,121,675 A | 6/1992 | Muller et al. |
| 5,127,876 A | 7/1992 | Howe et al. |
| 5,152,606 A | 10/1992 | Borraccia et al. |
| 5,156,568 A | 10/1992 | Ricci |
| 5,191,618 A | 3/1993 | Hisey |
| D340,765 S | 10/1993 | Joss et al. |
| 5,251,461 A | 10/1993 | Fallows, III et al. |
| 5,328,152 A | 7/1994 | Castle |
| 5,358,443 A | 10/1994 | Mitchell et al. |
| 5,399,119 A | 3/1995 | Birk et al. |
| 5,429,481 A | 7/1995 | Liu |
| 5,439,349 A | 8/1995 | Kupferberg |
| 5,439,352 A | 8/1995 | Line |
| 5,443,625 A | 8/1995 | Schaffhausen |
| 5,458,505 A | 10/1995 | Prager |
| 5,462,484 A | 10/1995 | Jung et al. |
| 5,511,942 A | 4/1996 | Meier |
| 5,513,953 A | 5/1996 | Hansen |
| 5,520,515 A | 5/1996 | Bailey et al. |
| 5,545,241 A | 8/1996 | Vanderauwera et al. |
| 5,547,343 A | 8/1996 | Jané et al. |
| 5,551,841 A | 9/1996 | Kamada |
| 5,561,952 A | 10/1996 | Damron |
| 5,569,019 A | 10/1996 | Katariya et al. |
| 5,584,656 A | 12/1996 | Rose |
| 5,595,068 A | 1/1997 | Amr |
| 5,613,833 A | 3/1997 | Wolfe et al. |
| 5,658,196 A | 8/1997 | Swaim |
| 5,664,872 A | 9/1997 | Spearman et al. |
| 5,709,458 A | 1/1998 | Metz |
| 5,725,356 A | 3/1998 | Carter |
| 5,791,985 A | 8/1998 | Schiedegger et al. |
| 5,822,186 A | 10/1998 | Bull |
| 5,918,972 A | 7/1999 | Van Belle |
| 5,934,783 A | 8/1999 | Yoshikawa |
| D414,550 S | 9/1999 | Bloom |
| 5,947,816 A | 9/1999 | Schiedegger et al. |
| 5,967,891 A | 10/1999 | Riley et al. |
| 5,997,253 A | 12/1999 | Fechan |
| 6,004,097 A | 12/1999 | Wark et al. |
| 6,068,385 A | 5/2000 | Hsieh |

(56) References Cited

U.S. PATENT DOCUMENTS

| | | |
|---|---|---|
| 6,095,671 A | 8/2000 | Hutain |
| 6,109,874 A | 8/2000 | Steiner |
| 6,145,798 A | 11/2000 | Janisse et al. |
| 6,149,513 A | 11/2000 | Lyu |
| 6,155,782 A | 12/2000 | Hsu |
| 6,168,517 B1 | 1/2001 | Cook |
| 6,176,680 B1 | 1/2001 | Ringblom et al. |
| 6,183,203 B1 | 2/2001 | Grintz |
| 6,192,702 B1 | 2/2001 | Shimogori |
| 6,196,915 B1 | 3/2001 | Schiedegger et al. |
| 6,319,304 B1 | 11/2001 | Moredock |
| D453,960 S | 2/2002 | Shelby et al. |
| 6,352,473 B1 | 3/2002 | Clark |
| 6,360,816 B1 | 3/2002 | Wagner |
| 6,361,428 B1 | 3/2002 | Tosconi et al. |
| 6,361,431 B1 | 3/2002 | Kawano |
| 6,364,760 B1 | 4/2002 | Rooney |
| 6,382,911 B1 | 5/2002 | Beltowski |
| 6,383,072 B2 | 5/2002 | Schiedegger et al. |
| 6,384,494 B1 | 5/2002 | Avidano et al. |
| 6,386,828 B1 | 5/2002 | Davis et al. |
| 6,386,970 B1 | 5/2002 | Vernier, II et al. |
| 6,386,972 B1 | 5/2002 | Schiedegger et al. |
| 6,435,964 B1 | 8/2002 | Chang |
| 6,451,080 B1 | 9/2002 | Rocklitz et al. |
| 6,458,028 B2 | 10/2002 | Snyder |
| 6,458,628 B1 | 10/2002 | Distefano et al. |
| 6,484,524 B1 | 11/2002 | Ulanov |
| 6,551,185 B1 | 4/2003 | Miyake et al. |
| 6,575,011 B1 | 6/2003 | Busby et al. |
| 6,581,974 B1 | 6/2003 | Ragner et al. |
| 6,582,291 B2 | 6/2003 | Clark |
| 6,592,328 B1 | 7/2003 | Cahill |
| 6,595,747 B2 | 7/2003 | Bos |
| 6,626,003 B1 | 9/2003 | Kortüm et al. |
| 6,626,636 B2 | 9/2003 | Bohn |
| D481,101 S | 10/2003 | Boehrs et al. |
| D481,159 S | 10/2003 | Walker |
| 6,648,752 B2 | 11/2003 | Vernier, II et al. |
| 6,679,433 B2 | 1/2004 | Gordon et al. |
| 6,682,308 B1 | 1/2004 | Fei et al. |
| 6,700,266 B2 | 3/2004 | Winkel et al. |
| 6,761,531 B2 | 7/2004 | Toye |
| 6,767,281 B2 | 7/2004 | McKee |
| 6,783,578 B2 | 8/2004 | Tillman, Jr. |
| 6,804,627 B1 | 10/2004 | Marokhovsky et al. |
| 6,805,627 B2 | 10/2004 | Marts et al. |
| 6,812,849 B1 | 11/2004 | Ancel |
| 6,886,270 B2 | 5/2005 | Gilmer |
| 6,916,240 B1 | 7/2005 | Morton |
| 6,938,631 B2 | 9/2005 | Gridley |
| 6,951,081 B2 | 10/2005 | Bonshor |
| 6,966,830 B2 | 11/2005 | Hurlstone et al. |
| 6,974,381 B1 | 12/2005 | Walker et al. |
| D514,688 S | 2/2006 | Avedon |
| 7,011,500 B2 | 3/2006 | Matson |
| 7,011,578 B1 | 3/2006 | Core |
| 7,044,849 B2 | 5/2006 | Dippel |
| 7,048,499 B2 | 5/2006 | Mathson et al. |
| 7,056,092 B2 | 6/2006 | Stahl |
| 7,056,368 B2 | 6/2006 | Moredock et al. |
| 7,101,064 B2 | 9/2006 | Ancel |
| 7,152,425 B2 | 12/2006 | Han et al. |
| 7,166,023 B2 | 1/2007 | Haigh et al. |
| 7,175,309 B2 | 2/2007 | Craw et al. |
| 7,185,504 B2 | 3/2007 | Kasai et al. |
| 7,201,110 B1 | 4/2007 | Pawlak |
| 7,201,650 B2 | 4/2007 | Demerath et al. |
| 7,214,035 B2 | 5/2007 | Bussieres et al. |
| 7,246,997 B2 | 7/2007 | Liu et al. |
| 7,288,023 B2 | 10/2007 | Leopold |
| 7,311,492 B2 | 12/2007 | Östberg |
| 7,320,636 B2 | 1/2008 | Seliger et al. |
| 7,331,764 B1 | 2/2008 | Reynolds et al. |
| D567,930 S | 4/2008 | Smith |
| 7,374,408 B2 | 5/2008 | Savage et al. |
| D570,981 S | 6/2008 | McClelland |
| 7,381,129 B2 | 6/2008 | Avedon |
| 7,467,931 B2 | 12/2008 | O'Toole |
| 7,473,074 B2 | 1/2009 | Herbst et al. |
| 7,476,079 B2 | 1/2009 | Bartlett |
| 7,497,773 B1 | 3/2009 | Schmidt |
| 7,516,578 B2 | 4/2009 | Bonshor |
| 7,544,124 B2 | 6/2009 | Polston |
| 7,549,258 B2 | 6/2009 | Lajewski |
| 7,566,034 B2 | 7/2009 | Bonshor |
| D599,471 S | 9/2009 | Borovicka et al. |
| 7,607,935 B2 * | 10/2009 | Dahl ................... F21S 8/02 |
| | | 362/149 |
| 7,610,726 B2 | 11/2009 | Lajewski |
| D605,332 S | 12/2009 | Miranda |
| 7,645,188 B1 | 1/2010 | Peerbolt |
| 7,651,390 B1 | 1/2010 | Profeta et al. |
| 7,677,770 B2 | 3/2010 | Mazzochette |
| 7,677,964 B1 | 3/2010 | Bucher et al. |
| 7,708,625 B2 | 5/2010 | Leseman et al. |
| D617,890 S | 6/2010 | Thomas |
| D620,096 S | 7/2010 | Underwood |
| 7,748,954 B2 | 7/2010 | Eguchi et al. |
| 7,752,814 B2 | 7/2010 | Bonshor |
| 7,774,999 B2 | 8/2010 | McKee |
| 7,780,510 B2 | 8/2010 | Polston |
| D631,148 S | 1/2011 | Benton et al. |
| 7,901,278 B2 | 3/2011 | O'Hagin |
| 7,930,858 B2 | 4/2011 | Lajewski |
| 8,052,386 B1 | 11/2011 | Fitzpatrick et al. |
| D672,863 S | 12/2012 | Romero Carreras |
| 1,053,025 A1 | 2/2013 | Goodwin |
| 8,366,387 B2 | 2/2013 | Reuter |
| D681,184 S | 4/2013 | Romero Carreras |
| D684,307 S | 6/2013 | Teller |
| 8,529,324 B2 | 9/2013 | Moredock et al. |
| 8,596,596 B2 | 12/2013 | Naji et al. |
| 8,616,842 B2 | 12/2013 | Avedon |
| D698,916 S | 2/2014 | Avedon |
| 8,641,375 B2 | 2/2014 | Tian et al. |
| D710,490 S | 8/2014 | Shurtleff |
| D715,904 S | 10/2014 | Tate et al. |
| 8,894,354 B2 | 11/2014 | Hodgson et al. |
| 8,899,930 B2 | 12/2014 | Innocent et al. |
| 8,967,983 B2 | 3/2015 | Kampf |
| 8,992,174 B2 | 3/2015 | Chang |
| 9,151,295 B2 | 10/2015 | Avedon |
| D743,521 S | 11/2015 | Jackson |
| D746,971 S | 1/2016 | Avedon |
| D747,453 S | 1/2016 | Stewart et al. |
| D755,438 S | 5/2016 | Kimmet |
| D756,498 S | 5/2016 | Norman et al. |
| 9,335,061 B2 | 5/2016 | Avedon |
| D758,642 S | 6/2016 | Eguchi |
| D768,844 S | 10/2016 | Koseoglu |
| 9,459,020 B2 | 10/2016 | Avedon |
| D775,719 S | 1/2017 | Smith et al. |
| D783,795 S | 4/2017 | Avedon |
| 9,631,627 B2 | 4/2017 | Avedon |
| 9,696,026 B1 | 7/2017 | Hardgrave |
| 9,702,576 B2 | 7/2017 | Avedon |
| 9,714,663 B2 | 7/2017 | Avedon |
| D805,176 S | 12/2017 | Avedon |
| 2001/0049927 A1 | 12/2001 | Toepel |
| 2002/0045420 A1 | 4/2002 | Taillon |
| 2002/0137454 A1 | 9/2002 | Baker |
| 2003/0092373 A1 | 5/2003 | Kuo |
| 2004/0050077 A1 | 3/2004 | Kasai et al. |
| 2004/0052641 A1 | 3/2004 | Chen |
| 2004/0240214 A1 | 12/2004 | Whitlow et al. |
| 2004/0253095 A1 | 12/2004 | Sasaki et al. |
| 2005/0092888 A1 | 5/2005 | Gonce |
| 2005/0159101 A1 | 7/2005 | Hrdina et al. |
| 2006/0087810 A1 | 4/2006 | Rockenfeller |
| 2006/0172688 A1 | 8/2006 | Johnson |
| 2006/0276123 A1 | 12/2006 | Sanagi et al. |
| 2006/0284435 A1 | 12/2006 | Vitito |
| 2007/0213003 A1 | 9/2007 | Railkar et al. |

(56) References Cited

U.S. PATENT DOCUMENTS

| | | |
|---|---|---|
| 2007/0231145 A1 | 10/2007 | Jin |
| 2007/0297906 A1 | 12/2007 | Wu |
| 2008/0019836 A1 | 1/2008 | Butz et al. |
| 2008/0188175 A1 | 8/2008 | Wilkins |
| 2008/0227381 A1 | 9/2008 | Avedon |
| 2009/0041580 A1 | 2/2009 | Wichmann et al. |
| 2009/0155080 A1 | 6/2009 | Yu |
| 2009/0170421 A1 | 7/2009 | Adrian et al. |
| 2009/0219727 A1 | 9/2009 | Weaver |
| 2009/0262550 A1 | 10/2009 | Inoue |
| 2010/0009621 A1 | 1/2010 | Hsieh |
| 2010/0052495 A1 | 3/2010 | Liu et al. |
| 2010/0075588 A1 | 3/2010 | Haneline |
| 2010/0176706 A1 | 7/2010 | Fu et al. |
| 2010/0192611 A1 | 8/2010 | Yamaguchi et al. |
| 2010/0202932 A1 | 8/2010 | Danville |
| 2010/0232168 A1 | 9/2010 | Horng |
| 2010/0266400 A1 | 10/2010 | Avedon |
| 2010/0328881 A1 | 12/2010 | Huang |
| 2011/0037368 A1 | 2/2011 | Huang |
| 2011/0057551 A1 | 3/2011 | Lee et al. |
| 2011/0057552 A1 | 3/2011 | Weaver |
| 2011/0080096 A1 | 4/2011 | Dudik et al. |
| 2011/0084586 A1 | 4/2011 | Lain et al. |
| 2011/0133622 A1 | 6/2011 | Mo et al. |
| 2011/0140588 A1 | 6/2011 | Chen |
| 2011/0223016 A1 | 9/2011 | Ediger et al. |
| 2012/0062095 A1 | 3/2012 | Horng |
| 2012/0194054 A1 | 8/2012 | Johnston |
| 2012/0195749 A1 | 8/2012 | Avedon |
| 2013/0011254 A1 | 1/2013 | Avedon |
| 2013/0023195 A1 | 1/2013 | Avedon |
| 2013/0027950 A1 | 1/2013 | Avedon |
| 2013/0196588 A1 | 8/2013 | Liao |
| 2014/0314560 A1 | 10/2014 | Avedon |
| 2015/0176851 A1 | 6/2015 | Avedon |
| 2015/0354578 A1 | 12/2015 | Avedon |
| 2016/0146222 A1 | 5/2016 | Avedon |
| 2017/0370363 A1 | 12/2017 | Avedon |

FOREIGN PATENT DOCUMENTS

| | | |
|---|---|---|
| CN | 10 1592328 | 12/2009 |
| CN | 201560963 | 8/2010 |
| DE | 44 13 542 | 10/1995 |
| DE | 196 38 518 | 4/1998 |
| DE | 10 2008 044874 | 3/2010 |
| EP | 0 037 958 | 10/1981 |
| EP | 0 212 749 | 3/1987 |
| EP | 0 772 007 | 5/1997 |
| EP | 2 248 692 | 11/2010 |
| FR | 0 715 101 | 11/1931 |
| FR | 2 784 423 | 4/2000 |
| GB | 0 792 369 | 3/1958 |
| GB | 0 824 390 | 11/1959 |
| GB | 0 981 188 | 1/1965 |
| GB | 1 251 880 | 11/1971 |
| GB | 2 344 619 | 6/2000 |
| GB | 2 468 504 | 9/2010 |
| JP | 55-032965 | 3/1980 |
| JP | 61-502267 | 10/1986 |
| JP | 01-067548 | 3/1989 |
| JP | 07-167097 | 7/1995 |
| JP | 07-253231 | 10/1995 |
| JP | 08-219939 | 8/1996 |
| JP | 11-132543 | 5/1999 |
| JP | 2001-193979 | 7/2001 |
| JP | 2002-349489 | 12/2002 |
| JP | 2006-350237 | 12/2006 |
| JP | 2010-181124 | 8/2010 |
| KR | 20-0176664 | 4/2000 |
| KR | 2003-0025428 | 3/2003 |
| KR | 10-1255739 | 4/2013 |
| RU | 2400254 C2 | 9/2010 |
| TW | M337636 | 8/2008 |
| WO | WO 01/034983 | 5/2001 |
| WO | WO 2005/091896 | 10/2005 |
| WO | WO 2006/078102 | 7/2006 |
| WO | WO 2008/062319 | 5/2008 |
| WO | WO 2010/046536 | 4/2010 |
| WO | WO 2010/114702 | 10/2010 |
| WO | WO 2011/067430 | 6/2011 |
| WO | WO 2012/174155 | 12/2012 |
| WO | WO 2012/174156 | 12/2012 |
| WO | WO 2015/187856 | 12/2015 |
| WO | WO 2016/081693 | 5/2016 |

OTHER PUBLICATIONS

"Airius Model R20 EC 'Eyeball' Data Sheet", http://airius.com.au/products/new-retail-series-2/attachment/na_std_retailseries/ published Jun. 15, 2016 as printed May 23, 2017 in 1 page.

Keeler Hardware, "OC Oval Cylinder Escutcheon", https://www.keelerhardware.com.au/products/oc-oval-cylinder-escutcheon, as printed Nov. 13, 2017 in 3 pages.

\* cited by examiner

COLUMNAR AIR MOVING DEVICES, SYSTEMS AND METHODS

CROSS-REFERENCE TO RELATED APPLICATIONS

This application claims benefit under 35 U.S.C. 119(e) to U.S. Provisional Patent Application No. 61/918,563, filed Dec. 19, 2013, the entire disclosure of which is hereby incorporated by reference herein in its entirety. Any and all priority claims identified in the Application Data Sheet, or any corrections thereto, are hereby incorporated by reference under 37 CFR 1.57.

This application is related to U.S. Patent Publication No. 2013/0027950 filed Jun. 13, 2012, and to U.S. Patent Publication No. 2012/0195749 filed Feb. 2, 2012, each of which is incorporated in its entirety by reference herein.

This application is also related to U.S. Patent Publication No. 2013/0011254, entitled Columnar Air Moving Devices, Systems and Methods, filed Jun. 13, 2012, and to U.S. Patent Publication No. 2013/0023195, entitled Columnar Air Moving Devices, Systems and Methods, filed Jun. 13, 2012, each of which is incorporated in its entirety by reference herein. This application is also related to U.S. Patent Publication No. 2008/0227381, filed May 30, 2008, and to U.S. Patent Publication No. 2010/0266400, filed Mar. 16, 2010, each of which is incorporated in its entirety by reference herein.

BACKGROUND OF THE INVENTIONS

Field of the Inventions

The present application relates generally to systems, devices and methods for moving air that are particularly suitable for creating air temperature de-stratification within a room, building, or other structure.

Description of the Related Art

The rise of warm air and the sinking of cold air can create significant variation in air temperatures between the ceiling and floor of buildings with conventional heating, ventilation and air conditioning systems. Air temperature stratification is particularly problematic in large spaces with high ceilings such as warehouses, gymnasiums, offices, auditoriums, hangers, commercial buildings, residences with cathedral ceilings, agricultural buildings, and other structures, and can significantly increase heating and air conditioning costs. Structures with both low and high ceiling rooms can often have stagnant or dead air, as well, which can further lead to air temperature stratification problems.

One proposed solution to air temperature stratification is a ceiling fan. Ceiling fans are relatively large rotary fans, with a plurality of blades, mounted near the ceiling. The blades of a ceiling fan have a flat or airfoil shape. The blades have a lift component that pushes air upwards or downwards, depending on the direction of rotation, and a drag component that pushes the air tangentially. The drag component causes tangential or centrifugal flow so that the air being pushed diverges or spreads out. Conventional ceiling fans are generally ineffective as an air de-stratification device in relatively high ceiling rooms because the air pushed by conventional ceiling fans is not maintained in a columnar pattern from the ceiling to the floor, and often disperses or diffuses well above the floor.

Another proposed solution to air temperature stratification is a fan connected to a vertical tube that extends substantially from the ceiling to the floor. The fan can be mounted near the ceiling, near the floor or in between. This type of device can push cooler air up from the floor to the ceiling or warmer air down from the ceiling to the floor. Such devices, when located away from the walls in an open space in a building, interfere with floor space use and are not aesthetically pleasing. When confined to locations only along the walls of an open space, such devices may not effectively circulate air near the center of the open space. Examples of fans connected to vertical tubes are disclosed in U.S. Pat. No. 3,827,342 to Hughes, and U.S. Pat. No. 3,973,479 to Whiteley.

A more practical solution is a device, for example, with a rotary fan that minimizes a rotary component of an air flow while maximizing axial air flow quantity and velocity, thereby providing a column of air that flows from a high ceiling to a floor in a columnar pattern with minimal lateral dispersion without a physical transporting tube. Examples of this type of device are described in U.S. patent Ser. No. 12/130,909, filed May 30, 2008, and U.S. patent application Ser. No. 12/724,799, filed Mar. 16, 2010, each of which is incorporated in its entirety by reference herein.

Fan and light combinations are also known. For example, ceiling fans often have light members positioned below the ceiling fan, used to help illuminate a room. Additionally, can lights, placed individually in ceiling structures of bathrooms, kitchens, and other residential rooms are also known. These can lights can sometimes include a fan member for ventilation purposes. Sometimes the fan member can be used to cool a recessed lighting. Examples can be found in U.S. Pat. No. 7,607,935, or U.S. Pat. No. 6,095,671.

SUMMARY OF THE INVENTION

An aspect of at least one of the embodiments disclosed herein includes the realization that light source members (e.g. LED light engines) mounted within the ceiling structure of a room or building are often susceptible to damage from high levels of heat in the surrounding air. The life expectancy of a light source member can be directly proportional to the level of heat within a building, and especially the level of heat adjacent a ceiling. It has been found, for example, that for some light source members, the life of the light source member decreases by 50% for every 10° F. over 77° F. in the area surrounding the light source member.

Therefore, it would be advantageous to not only have an air de-stratification device that is designed to de-stratify the air in a room and reduce pockets of high temperature near the ceiling, but also to have an air de-stratification device that additionally houses a light source member, and through use of heat exchange during the de-stratification process, keeps the light source member as cool as possible.

Thus, in accordance with at least one embodiment described herein, a columnar air moving device can comprise a housing member forming an interior space within the air moving device, the housing member comprising at least one opening for directing a volume of air into the interior space, a rotary fan assembly mounted within the interior space, the rotary fan assembly comprising an impeller and a plurality of blades for directing a volume of air in a downwardly direction, an elongate nozzle communicating with and extending downwardly from the rotary fan assembly, the elongate nozzle comprising at least one structure for directing the volume of air downwardly out of the air moving device in a generally columnar manner, and a light source member positioned at least partially within the nozzle, the light source member configured to direct light out of the air moving device, the light source member positioned within a flow of the volume of air being directed downwardly through the nozzle and out of the air moving device, and at least one vent structure located between the rotary fan assembly and the bottom of the air moving device.

In accordance with at least one embodiment described herein, an air moving device can include a housing having a first end and a second end; an impeller rotatably mounted within the housing adjacent the first end of the housing, the impeller having one or more rotor blades capable of directing a volume of air toward the second end of the housing; and a nozzle having a connection end and an outlet end, the connection end of the nozzle connected to the second end of the housing, the nozzle and the housing forming an interior of the air moving device. The device can also include a first bypass wall mounted between the impeller and the outlet end of the nozzle in the interior of the air moving device. An interior surface of the first bypass wall can form a bypass flow channel, the first bypass wall directing a bypass portion of the volume of air through the bypass flow channel toward the outlet end of the nozzle. The device can also include one or more stator vanes positioned within the interior of the air moving device between the impeller and the outlet end of the nozzle, the one or more stator vanes configured to direct the volume of air out from the outlet end of the nozzle in a generally columnar manner. The device can also include a light unit mounted within the interior of the air moving device and a heat sink connected to the light unit and positioned at least partially within the interior of the air moving device such that some or all of the bypass portion of the volume of air passes over the heat sink. In some embodiments, a first end of the second bypass wall is mounted to an inner wall of the interior of the air moving device and forms a continuous interior wall therewith between the impeller and an inlet to the bypass flow channel.

In accordance with at least one embodiment described herein, an air moving device for de-stratifying air within an enclosure can include a housing defining an interior of the air moving device and having an inlet and an outlet, a diameter of the outlet being less than a diameter of the inlet. The device can include a rotary fan mounted within the interior of the air moving device and capable of directing a volume of air from the inlet toward the outlet, an annular (e.g., having a polygonal cross-sectional shape, a curved cross-sectional shape, or some combination thereof) bypass member having an inner wall and an outer wall, the bypass member mounted between the rotary fan and the outlet, an interior of the bypass member defining a bypass channel through which a bypass portion of the volume of air is directed. The device can also include one or more vanes positioned within the interior of the air moving device between the impeller and the outlet end of the nozzle, the one or more vanes configured to direct the volume of air out from the outlet end of the nozzle in a generally columnar manner. The device can also include a light unit mounted within the interior of the air moving device between the bypass member and the outlet, and a conductive member connected to the light unit and positioned at least partially within the interior of the air moving device such that some or all of the bypass portion of the volume of air passes over the conductive member.

BRIEF DESCRIPTION OF THE DRAWINGS

These and other features and advantages of the present embodiments will become more apparent upon reading the following detailed description and with reference to the accompanying drawings of the embodiments, in which.

DETAILED DESCRIPTION OF THE PREFERRED EMBODIMENTS

Figure 1:
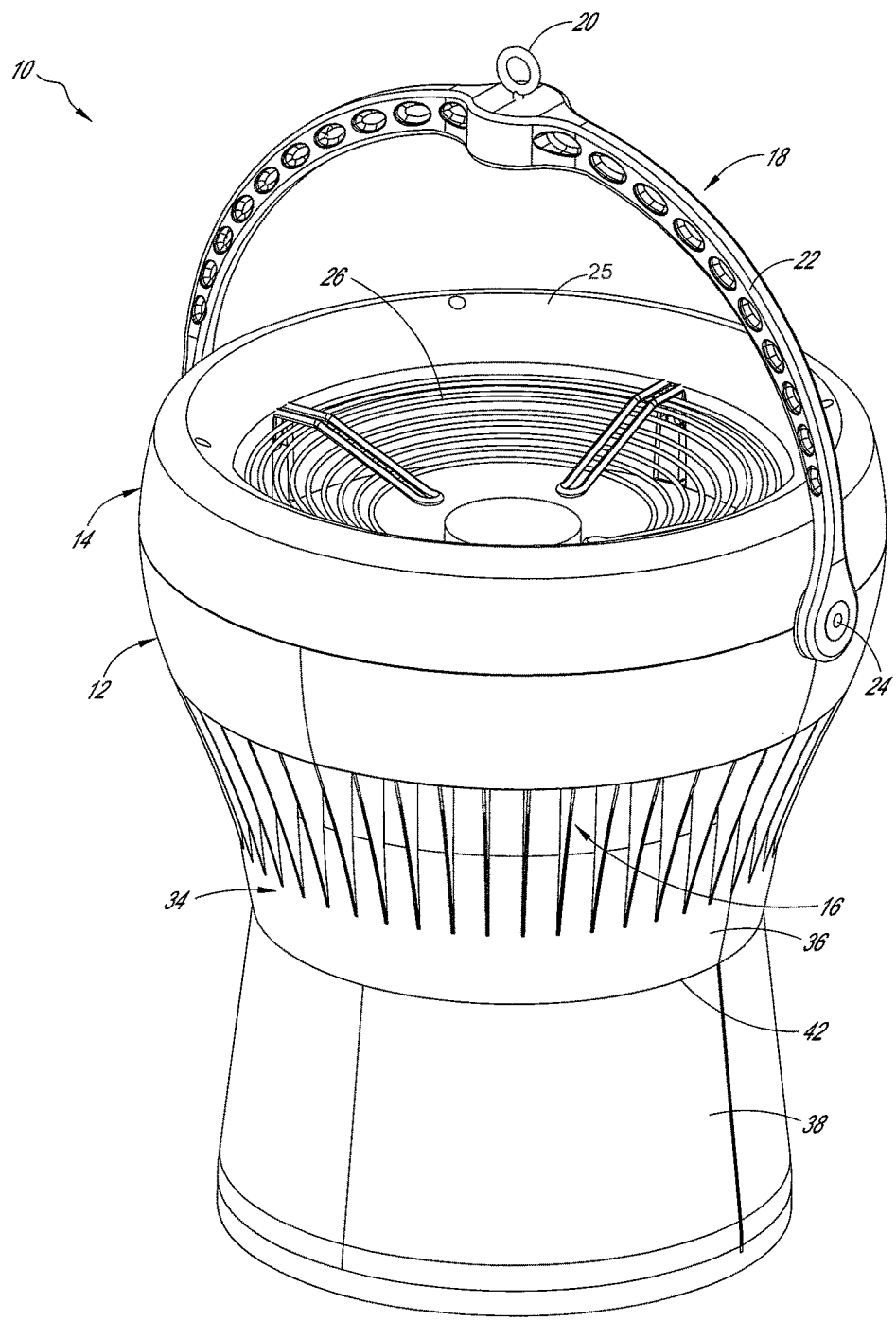
FIG. 1 is a top perspective view of an air moving device in accordance with an embodiment.
Figure 2:
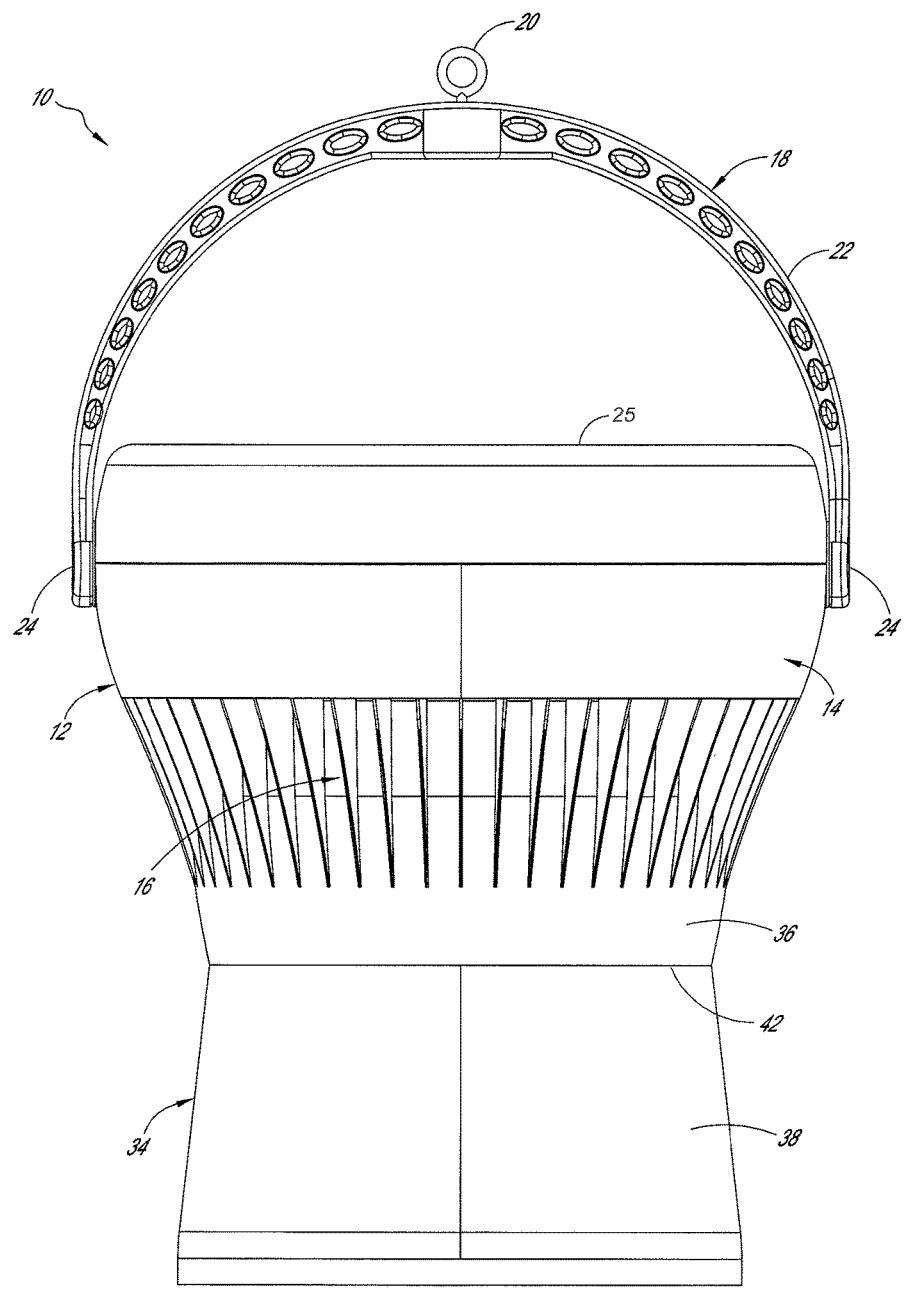
FIG. 2 is a front elevation view of the device of FIG. 1.
Figure 3:
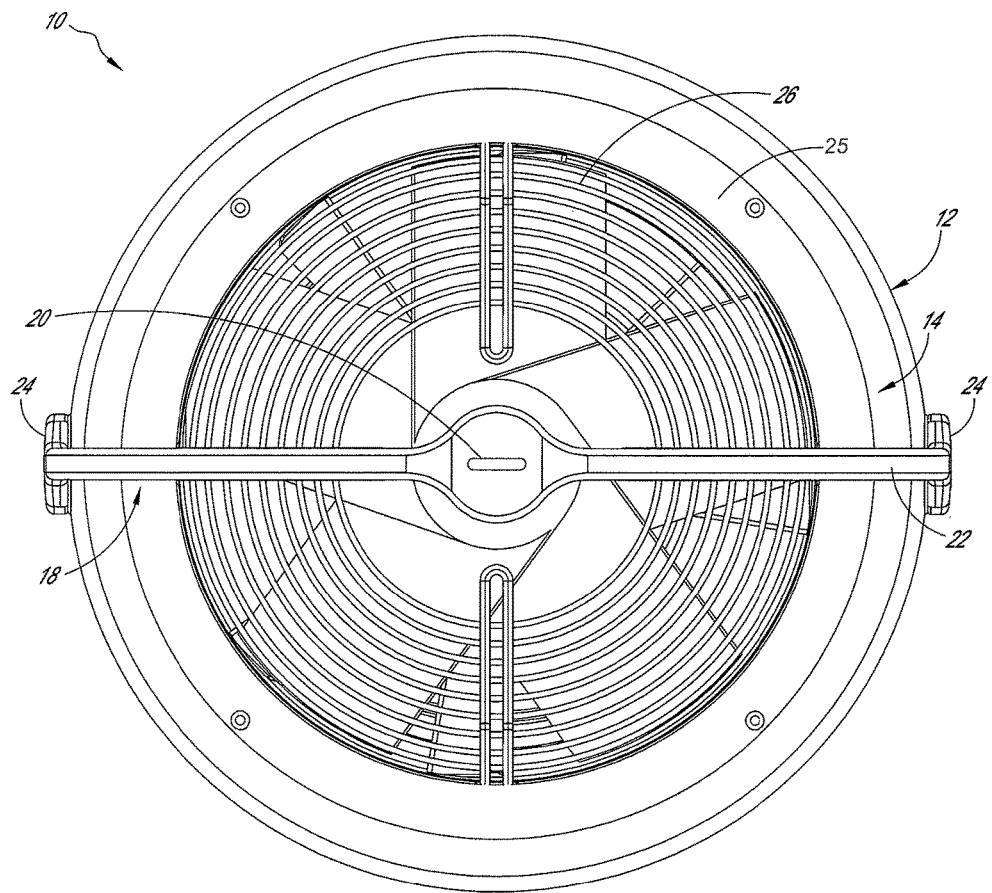
FIG. 3 is a top plan view of the device of FIG. 1.
Figure 4:
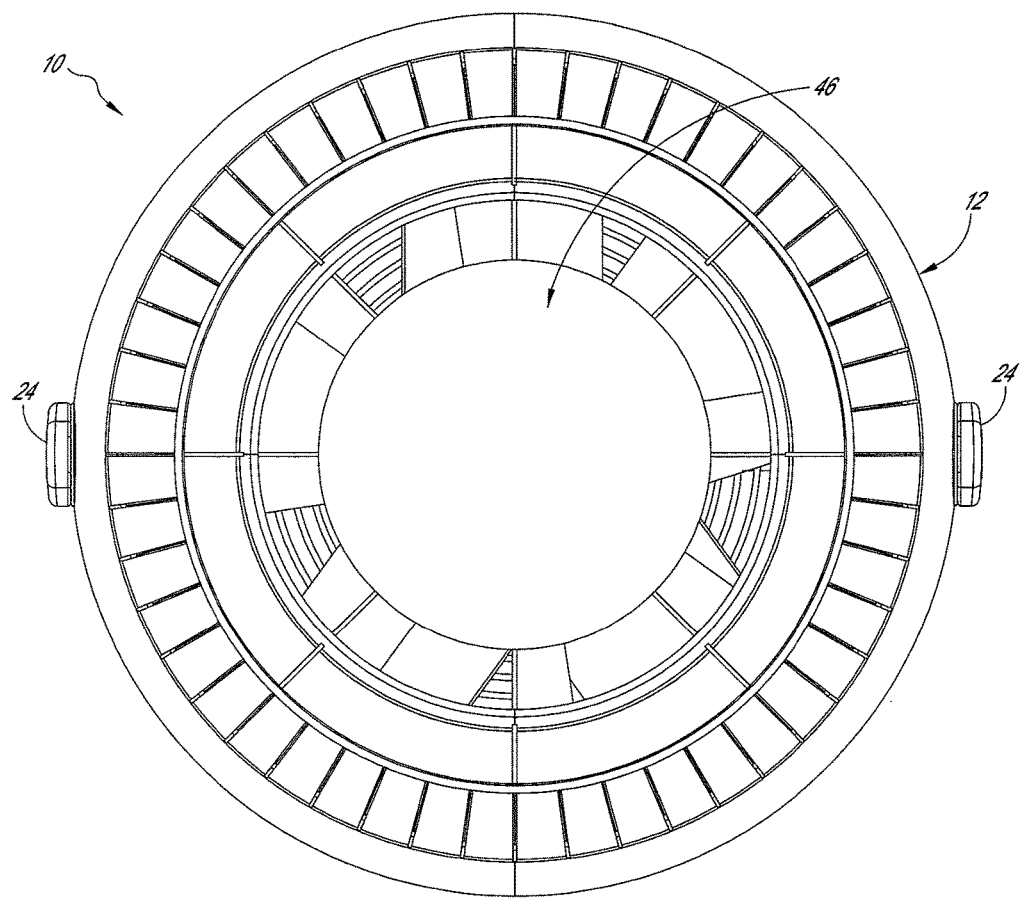
FIG. 4 is a bottom plan view of the device of FIG. 1.

With reference to FIGS. 1-4, an air moving device 10 can comprise a housing member 12. The housing member 12 can form an outer shell of the air moving device 10, and can at least partially enclose an interior space within the air moving device 10. The housing member 12 can be formed from one or more sections. For example, the housing member 12 can comprise an upper housing section 14, and a lower housing section 16. In some embodiments the upper and lower housing sections 14, 16 can be attached to one other through use of fasteners, adhesive, or other structure. In some embodiments, the upper housing section 14 and lower housing section 16 can be integrally formed as a single piece.

The air moving device 10 can include a support member 18. The support member 18 can be used to support the weight of the air moving device 10, and/or to attach the air moving device 10 to another structure. In some embodiments, the support member 18 can comprise a ring-shaped structure 20 (e.g. an eye-bolt). The support member 18 can extend from the upper housing section 14. The support member 18 can be used, for example, to hang the air moving device 10 from a ceiling structure within a building, for example with wire, string, rope, or other device(s). In some embodiments, the housing member 12 can comprise multiple support members 18.

In some embodiments, the support member 18 can comprise a generally arched structure 22. The arched structure 22 can be connected to the housing member 12 with two ratcheting structures 24 on either side of the air housing member 12. The ratcheting structures 24 can enable the arched structure 22 to be moved (e.g. pivoted) relative to the rest of the housing member 12. This can allow the air moving device 10 to be hung, for example, above a first location on the floor of a room or building, and to be angled such that it directs air to a second, different location on the floor of the room or building.

With continued reference to FIGS. 1-4 and 8, in some embodiments the housing member 12 can comprise a cowling 25 and an intake grill 26. The cowling 25 and intake grill 26 can be configured to direct a volume of air into the interior space of the air moving device 10. For example, the cowling 25 can comprise a structure with a curved profile that extends inwardly into the air moving device 10. The intake grill 26 can sit slightly below the cowling 25. Air from the surrounding environment can be directed over the curved surface of the cowling 25, through the intake grill 26, and down into the interior space of the air moving device 10. The intake grill 26 can inhibit or prevent unwanted debris from entering the interior space of the air moving device 10. Other structures for air intake are also possible, including but not limited to one or more air vents situated on and around the housing member 12.

Figure 5:
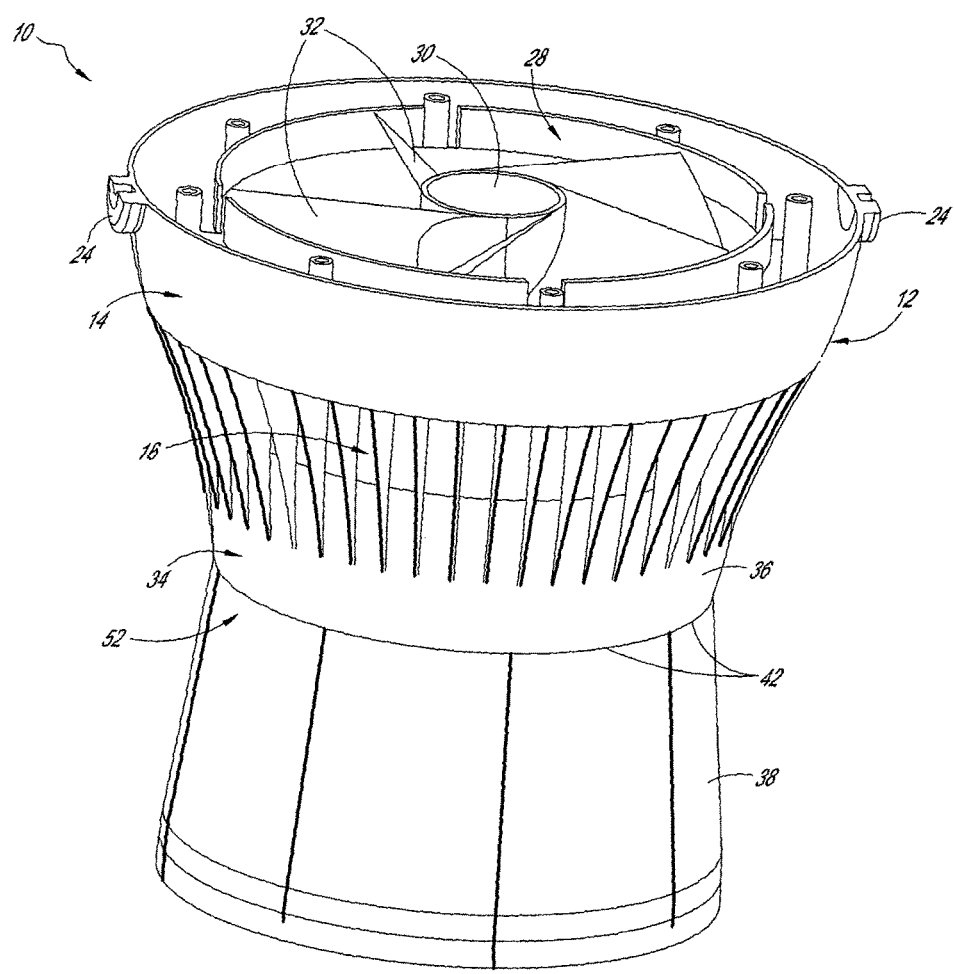
FIG. 5 is a perspective, partial view of the device of FIG. 1, taken along line 5-5 in FIG. 2.
Figure 8:
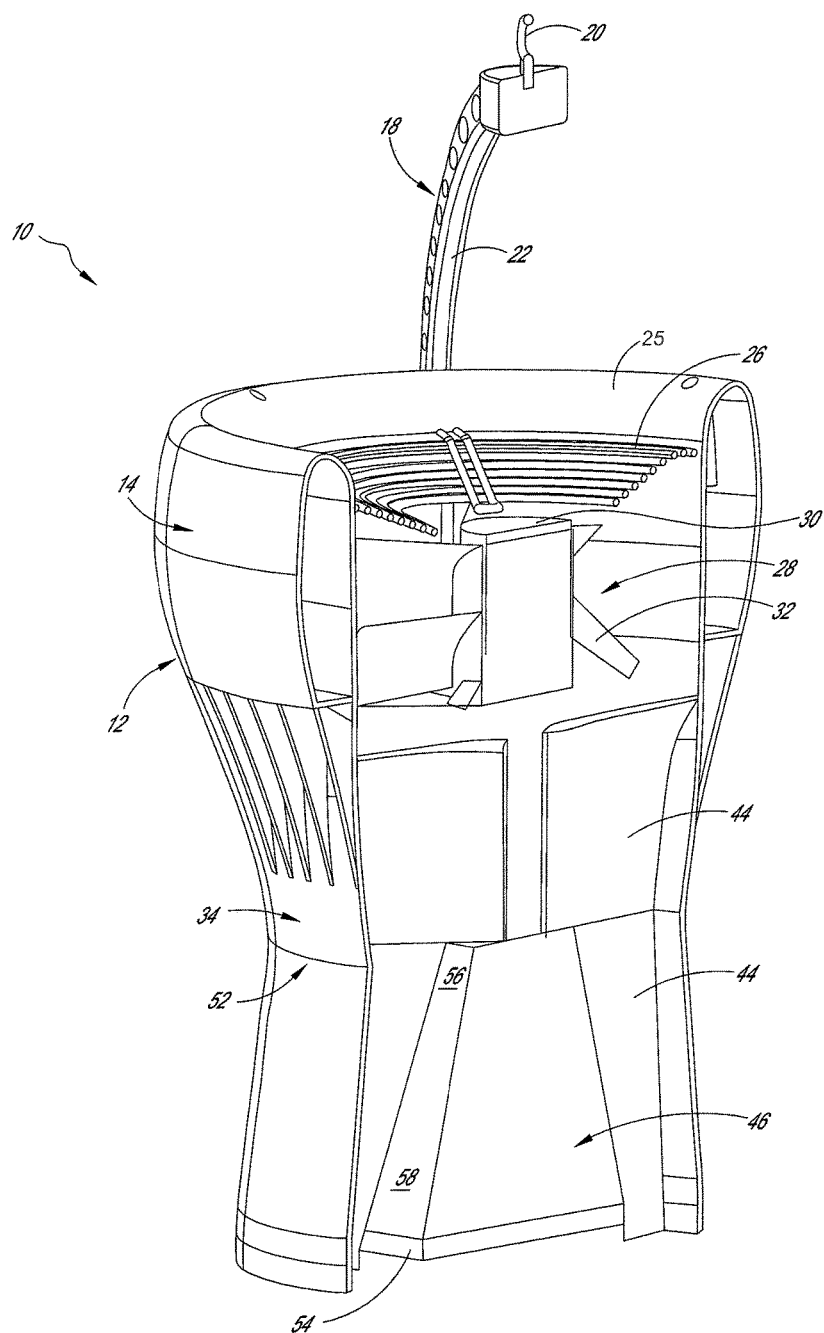
FIG. 8 is cross-sectional view of the device of FIG. 1, taken along line 9-9 in FIG. 2.
Figure 9:
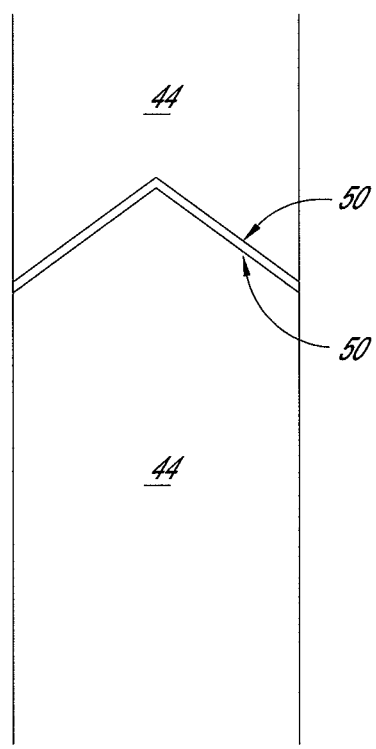
FIG. 9 is a schematic view of a connection feature between two stator vanes in the air moving device of FIG. 1.
Figure 10:
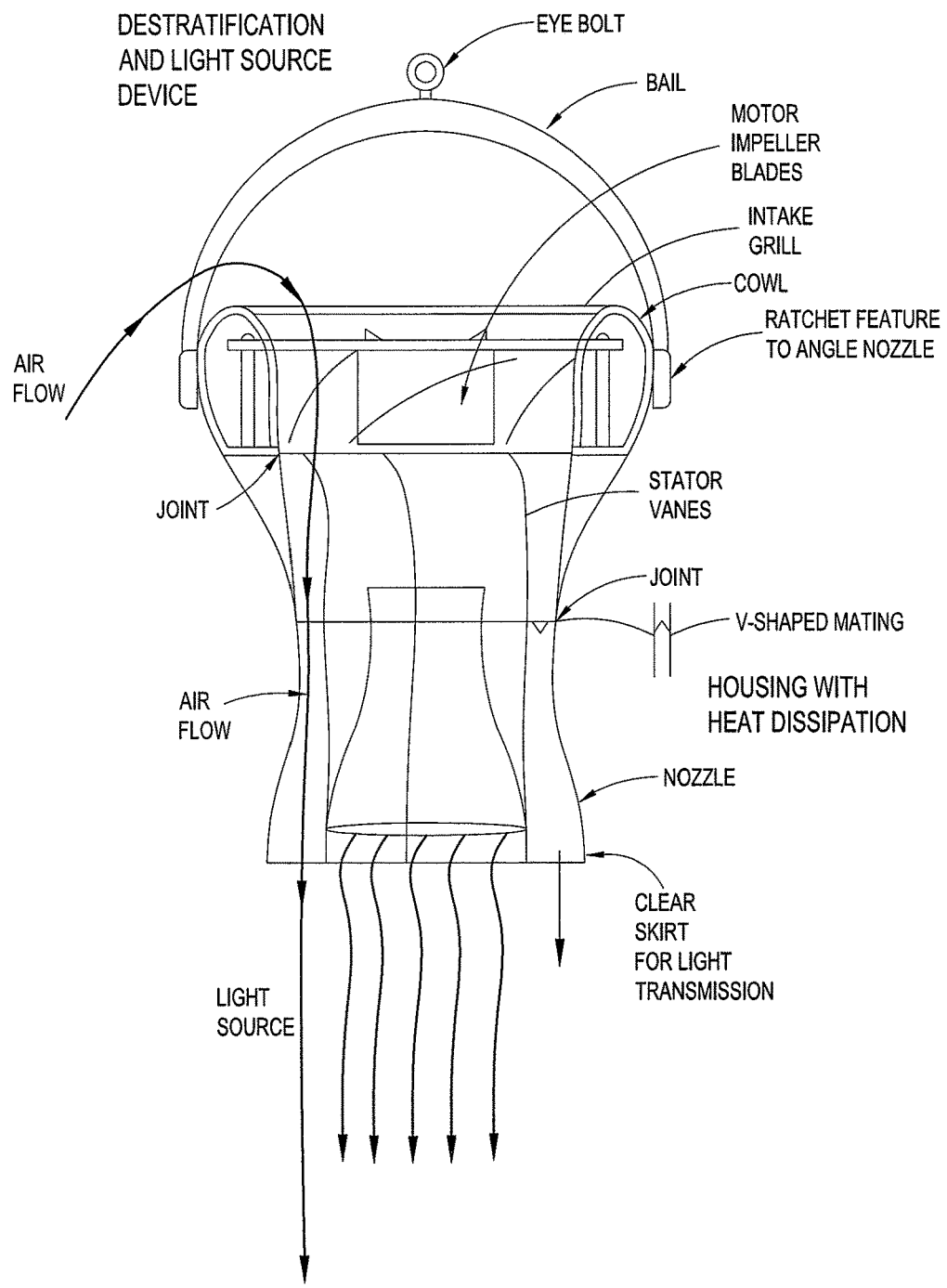
FIG. 10 is a schematic, cross-sectional view of an air moving device according to an embodiment.

With reference to FIGS. 5 and 8, the air moving device 10 can comprise a rotary fan assembly 28 mounted within the interior space. The rotary fan assembly 28 can comprise an impeller 30 and a plurality of blades 32. The rotary fan assembly 28 can be configured to direct a volume of air that has entered through the cowling 25 and intake grill 26 downwardly through the air moving device 10. The rotary fan assembly 28 can push, or force, a volume of air downwardly within the interior space of the air moving device 10. The rotary fan assembly 28 can comprise a motor. For example, the impeller 30 itself can house a motor (not shown). The motor can cause the impeller 30 and blades 32 to spin. In some embodiments, the motor can be located elsewhere within the air moving device 10, or located at least partially outside the air moving device 10. The rotary fan assembly 28 can comprise at least one electrical component. In some embodiments, the rotary fan assembly 28 can be mounted to the lower housing section 16.

With continued reference to FIGS. 1-4, the air moving device 10 can comprise a nozzle 34. The nozzle 34 can communicate with and extend downwardly from the housing member 12. In some embodiments, the nozzle 34 is attached to the housing member 12. The nozzle 34 can communicate with and extend downwardly from the rotary fan assembly 28. In some embodiments, the nozzle 34 is attached to the rotary fan assembly 28.

The nozzle 34 can comprise a structure for directing a volume of air out of the air moving device 10. For example, the nozzle 34 can comprise a structure for directing a volume of air out of the air moving device 10 that has previously entered through the cowling 25, intake grill 26, and rotary fan assembly 28.

With reference to FIGS. 1, 2, and 5-8, the nozzle 34 can have multiple sections. For example, the nozzle 34 can comprise a first section 36 extending downwardly from the lower housing section 16, and angled generally inwardly. The nozzle 34 can have a second section 38 located below the first section 36, and angled generally outwardly. In some embodiments, the nozzle 34 can have additional sections.

In some embodiments, the nozzle 34 can include sections that are integrally formed together. For example, the first and second sections 36, 38 can be formed integrally together.

In some embodiments, the nozzle 34 can include sections that are releasably connected together. For example, one or more of the first and second sections 36, 38 can be releasably connected to one another. In some embodiments, the second section 38 can be releasably connected to the first section 36. The connection of the first section 36 to the second section 38 can form a joint 42 around the air moving device 10. In some embodiments, a locking device or mechanism can lock one or more sections of the nozzle 34 together. For example, the first section 36 can be locked together with the second section 38 at the joint 42.

Figure 6:
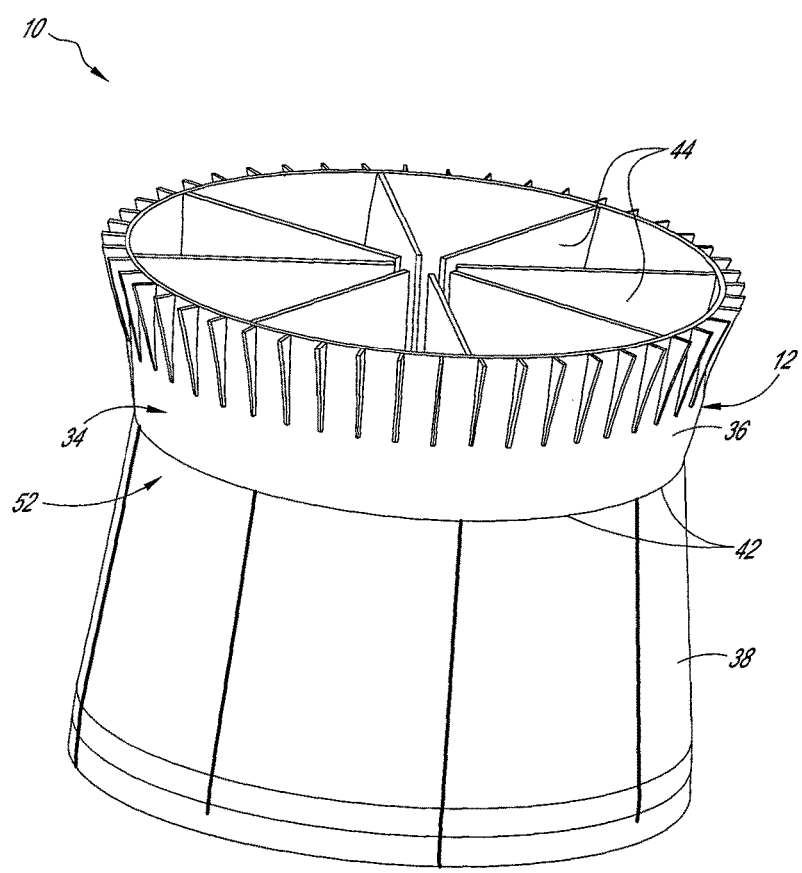
FIG. 6 is a perspective, partial view of the device of FIG. 1, taken along line 6-6 in FIG. 2.
Figure 7:
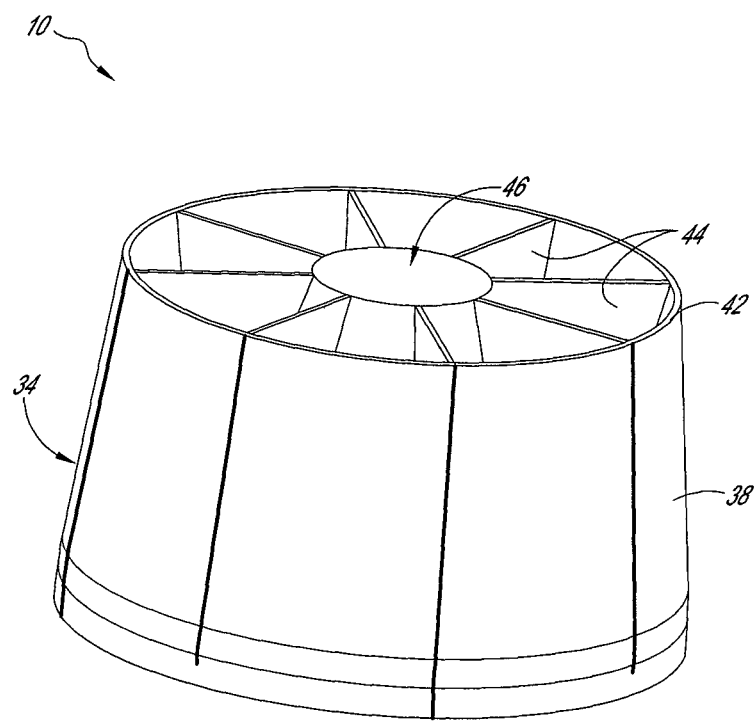
FIG. 7 a perspective, partial view of the device of FIG. 1, taken along line 7-7 in FIG. 2.

With reference to FIGS. 6-8, the nozzle 34 can comprise at least one stator vane 44. The stator vanes 44 can be positioned equidistantly in a circumferential pattern within the nozzle 34. In some embodiments, eight stator vanes 44 can be used. The stator vanes 44 can direct a volume of air that has entered through the rotary fan assembly 28. The stator vanes 44 can be used to straighten a volume of air within the nozzle 34. The stator vanes 44 can be used to force a volume of air to move in a generally columnar direction downwardly towards the floor of a building or other structure, with minimal lateral dispersion, similar to the devices described for example in U.S. Pat. No. 7,381,129, and U.S. patent application Ser. No. 12/724,799, each of which is incorporated in its entirety by reference herein. In some embodiments, the nozzle 34 can have no stator vanes 44.

In some embodiments, the air moving device 10 can be a self-contained unit, not connected to any ductwork, tubing, or other structure within a room or building. The air moving device 10 can be a stand-alone de-stratification device, configured to de-stratify air within a given space.

In some embodiments, the air moving device 10 can have an overall height (extending from the top of the housing member 12 to the bottom of the nozzle 34) that ranges from between approximately one foot to four feet, though other ranges are also possible. For example, in some embodiments the air moving device 10 can have an overall height that ranges from approximately two feet to three feet. In some embodiments the housing member 12 can have an overall outside diameter that ranges from approximately 8 inches to 30 inches, though other ranges are also possible. For example, in some embodiments the housing member 12 can have an overall outside diameter that ranges from approximately 12 inches to 24 inches. In some embodiments, the nozzle 34 can have an outside diameter that ranges between approximately 5 inches to 12 inches, though other ranges are possible. For example, in some embodiments the nozzle 34 can have an outside diameter that ranges from between approximately 8 to 10 inches. In embodiments for example where a light source member 46 is included in the nozzle 34, the nozzle 34 can have an outside diameter that ranges from 20 inches to 28 inches, though other diameters are also possible. In some embodiments the air moving device 10 can have a motor with an overall power that ranges between approximately 720 and 760 watts, though other ranges are possible. In some embodiments the air moving device 10 can have a motor with an overall power that is approximately 740 watts (i.e. about 1.0 hp).

With reference to FIGS. 4, 7, 8, and 10, the air moving device 10 can comprise at least one light source member 46. The light source member 46 can be positioned at least partially within the nozzle 34. The light source member 46 can comprise any of a variety of light sources, including but not limited to an LED light source, and/or a lamp. In some embodiments, the light source member 46 can comprise a bulb and/or lens. The light source member 46 can be attached to the nozzle 34. The light source member 46 can fit within a recess formed within the nozzle 34. The light source member 46 can be configured to direct light out of the air moving device 10. For example, the light source member can be configured to direct light out of a bottom of the nozzle 34.

In some embodiments, the light source member 46 can be mounted within a section of the nozzle 34. For example, the light source member 46 can be mounted within the plurality of stator vanes 44. In some embodiments, the stator vanes 44 can include cut-out portions configured to form a cavity or opening for insertion of the light source member 46. The light source member 46 can rest on top the stator vanes 44 within the nozzle 34, without being securely attached to the nozzle 34. In some embodiments, the light source member 46 can be positioned within the nozzle 34 such that stator vanes 44 are located directly above and directly below the light source member 46.

With continued reference to FIG. 8, and as described above, at least a portion of the nozzle 34 can be removed and/or replaced. For example, the second section 38 can be removed from the air moving device 10, so that the light source member 46 can be taken out and replaced with a different light source member 46. In some embodiments, an entire portion of the nozzle 34 can be removed and replaced, along for example with the light source member 46. In some embodiments, portions of the nozzle 34 can be locked together with tabs, friction fit, and/or other locking mechanisms.

With reference to FIGS. 6, 7, 9, and 10, in some embodiments the stator vanes 44, and/or other portions of the air moving device 10, can have a v-shaped section or sections 50 along their edge. The v-shaped sections 50 can fit, or mate together, to form a joint or joints within the nozzle 34. The v-shaped sections 50 can facilitate joining one or more portions of the nozzle 34 together. Other connection or mating mechanisms are also possible.

With continued reference to FIGS. 5, 6, 8, and 10, the nozzle 34 can comprise at least one restriction portion 52. The restriction portion 52 can comprise an area of the nozzle 34 that extends inwardly relative to the rest of the nozzle 34. The restriction portion 52 can form a venturi within the nozzle 34. The restriction portion 52 can force air moving through the nozzle 34 to accelerate. The restriction portion 52 can create a narrowed channel for air to pass through within the nozzle 34. In some embodiments, at least one restriction portion 52 can be formed generally at the joint 42. In some embodiments, the restriction portion 52 can be configured to accelerate air flow past the light source member 46, so as to better cool the light source member 46.

As described above, light source members 46 can be susceptible to high levels of heat. The life of a light source member 46 can be directly proportional to the level of surrounding heat. Therefore, by placing the light source member 46 within and/or adjacent the flow of air moving through the nozzle 34, the light source member 46 can be cooled. Further, by including a recessed portion 52, the cooling can be increased.

With reference to FIG. 8, in some embodiments, the light source member 46 can include a lens 54 on one end. The lens 54 can be configured to direct light out of the nozzle 34. In some embodiments, the volume of air moving through the nozzle 34 can flow adjacent the lens 54, but not directly at or towards the lens 54. In some embodiments, the light source member 46 can have a generally cone-like shape, having a first end 56 and a second end 58, forming a bulb that emits light. Other types and shapes of light source members are also possible. In some embodiments, the shape of the light source member 46 itself can generate a restriction within the nozzle, and increase the air flow along the lower, larger diameter end 58 of the light source member 46, thereby facilitating cooling of the light source member.

In some embodiments, the light source member 46 can be configured to direct light in a first direction out of the air moving device 10 and into a room or other structure. In some embodiments, the first direction is a generally downward direction. In some embodiments, the light source member 46 can be configured to direct light out of the air moving device 10 to illuminate a particular target space. Similarly, in some embodiments the air moving device 10 can be configured to direct air in a first direction out of the air moving device 10 and into a room or other structure. The first direction can be a generally downward direction. In some embodiments, the air moving device 10 can be configured to direct air out of the air moving device 10 to de-stratify a particular target space.

In some embodiments, at least a portion of the outer body 48 of the nozzle 34, and/or at least one of the stator vanes 44, can be transparent. The transparency can allow the light from the light source member 46 to not only emanate in a generally longitudinal direction downwardly out of the air moving device, but also radially outwardly. The transparency can facilitate a wider area within which the light from the light source member 46 emanates.

Figure 11:
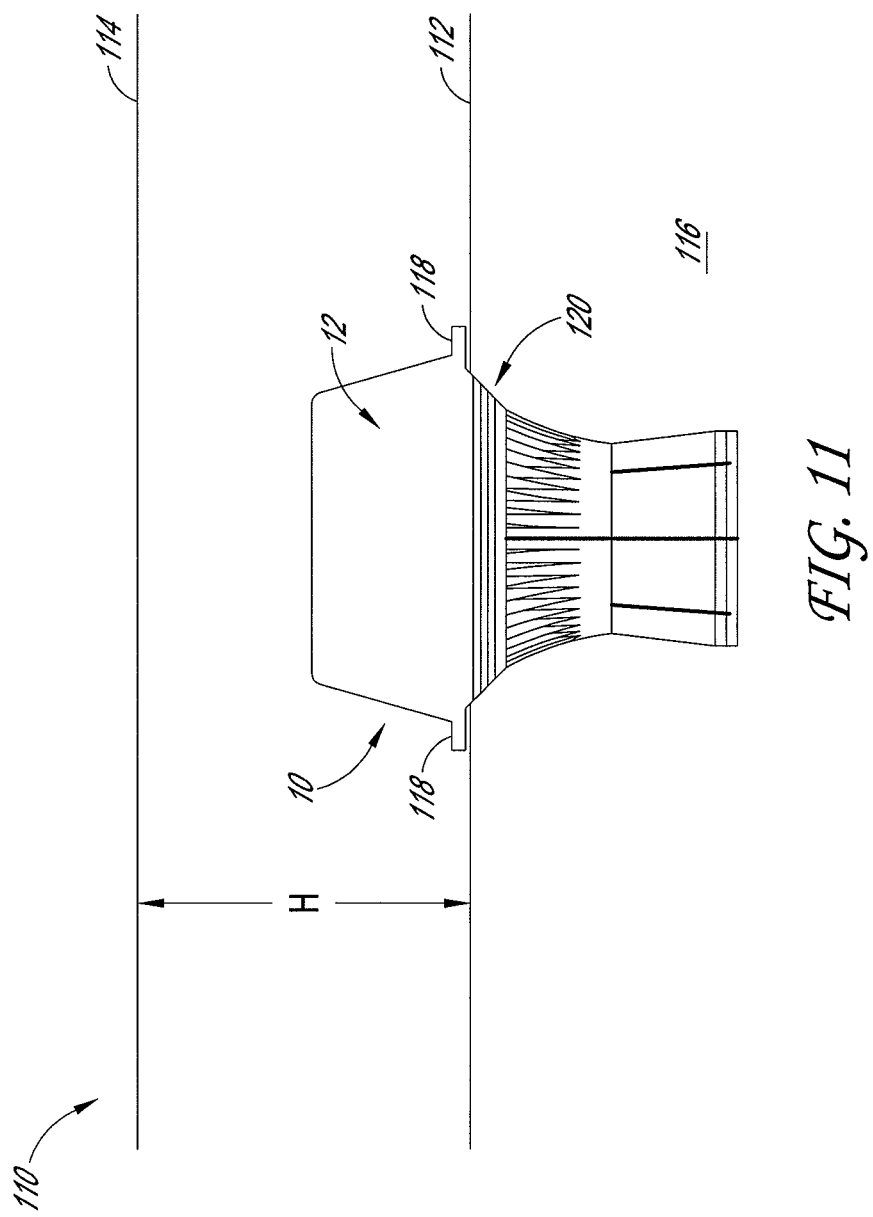
FIG. 11 is a schematic view of an air moving device in accordance with an embodiment mounted within a ceiling structure.
Figure 12A:
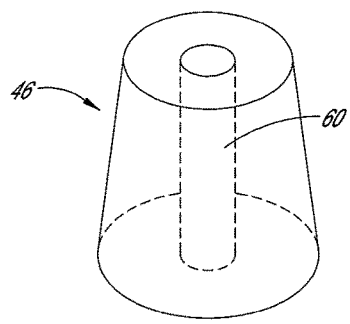
FIGS. 12A-F are illustrations of embodiments of light source members with one or more channels therethrough, FIGS. 12A, 12C, and 12E being top perspective views of three different embodiments, and FIGS. 12B, 12D, and 12F being the corresponding bottom plan views thereof.
Figure 12B:
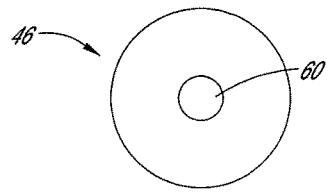
Figure 12C:
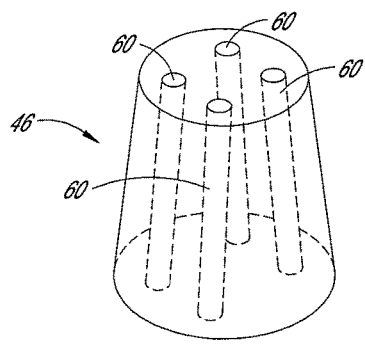
Figure 12D:
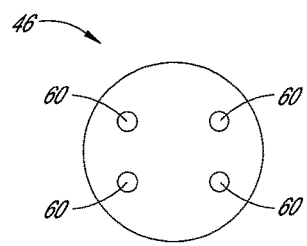
Figure 12E:
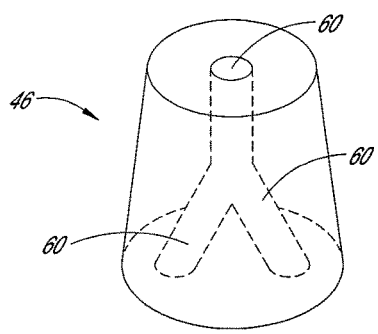
Figure 12F:
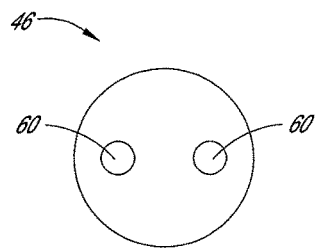

With reference to FIG. 11, an air moving device 10 that includes a light source member 46 can be mounted within a ceiling structure 110, as opposed to for example being hung from a ceiling structure. The ceiling structure 110 can comprise, for example, a first ceiling level 112, and a second ceiling level 114 separated from the first ceiling level 112 by a height H. The air moving device 10 can be supported by the first ceiling level 112, and/or mounted to the first ceiling level 112, such that at least a portion of the air moving device 10 is positioned between the first and second ceiling levels 112, 114, and so that a volume of air is directed into a room 116 below the ceiling structure 110. For example, the air moving device 10 can comprise a support member 118 for supporting the housing member 12 (the top of which can be in the form of a dome-like structure) on the ceiling level 112, and at least one air vent 120 can be located below the first ceiling level 112, so as to direct air from the room 116 into the air moving device 10.

In some embodiments, the light source member 46 can be relatively large and difficult to cool because of its shape and/or size. The light source member 46 can also block some of the flow of air from moving out of the air moving device 10, thereby creating unwanted back pressure within the air moving device 10. Unwanted back pressure can inhibit the efficiency of the air moving device 10. For example, the unwanted back pressure can slow the de-stratification process.

Therefore, in at least some embodiments, and with reference to FIGS. 12A-F, the light source member 46 can have one or more channels 60 for directing air flow out of the air moving device 10. The channels 60 can extend partially or entirely through the light source member 46. The channels 60 can be used to help cool the light source member 46, by directing air along one or more surfaces of the light source member 60. The channels can also, or alternatively, be used to more efficiently move the air through the air moving device 10, and inhibit unwanted back pressure. The channels can be formed by slots, holes, tubes, and/or other structures that create one or more channels extending through the light source member 46.

Figure 13:
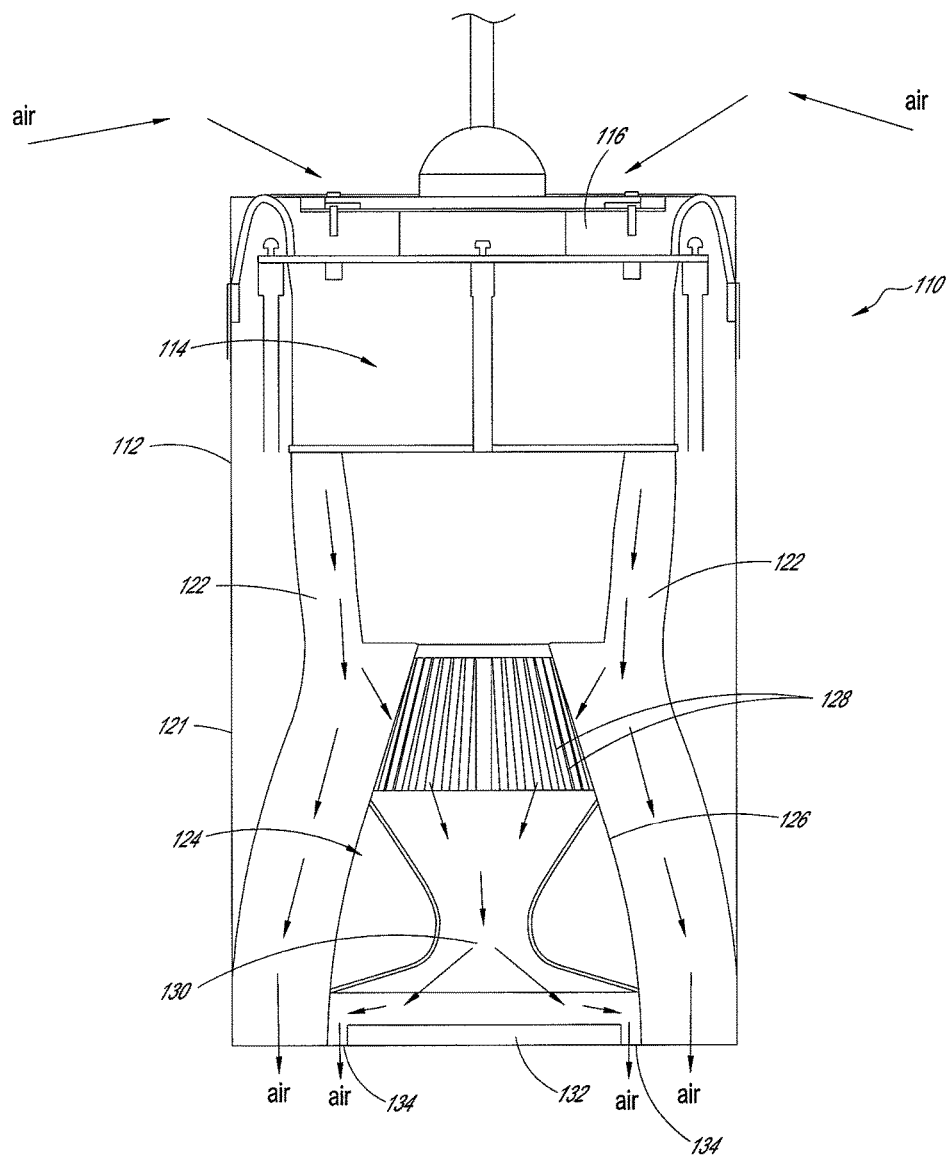
FIG. 13 is a front, cross-sectional view of an air moving device in accordance with another embodiment.
Figure 14:
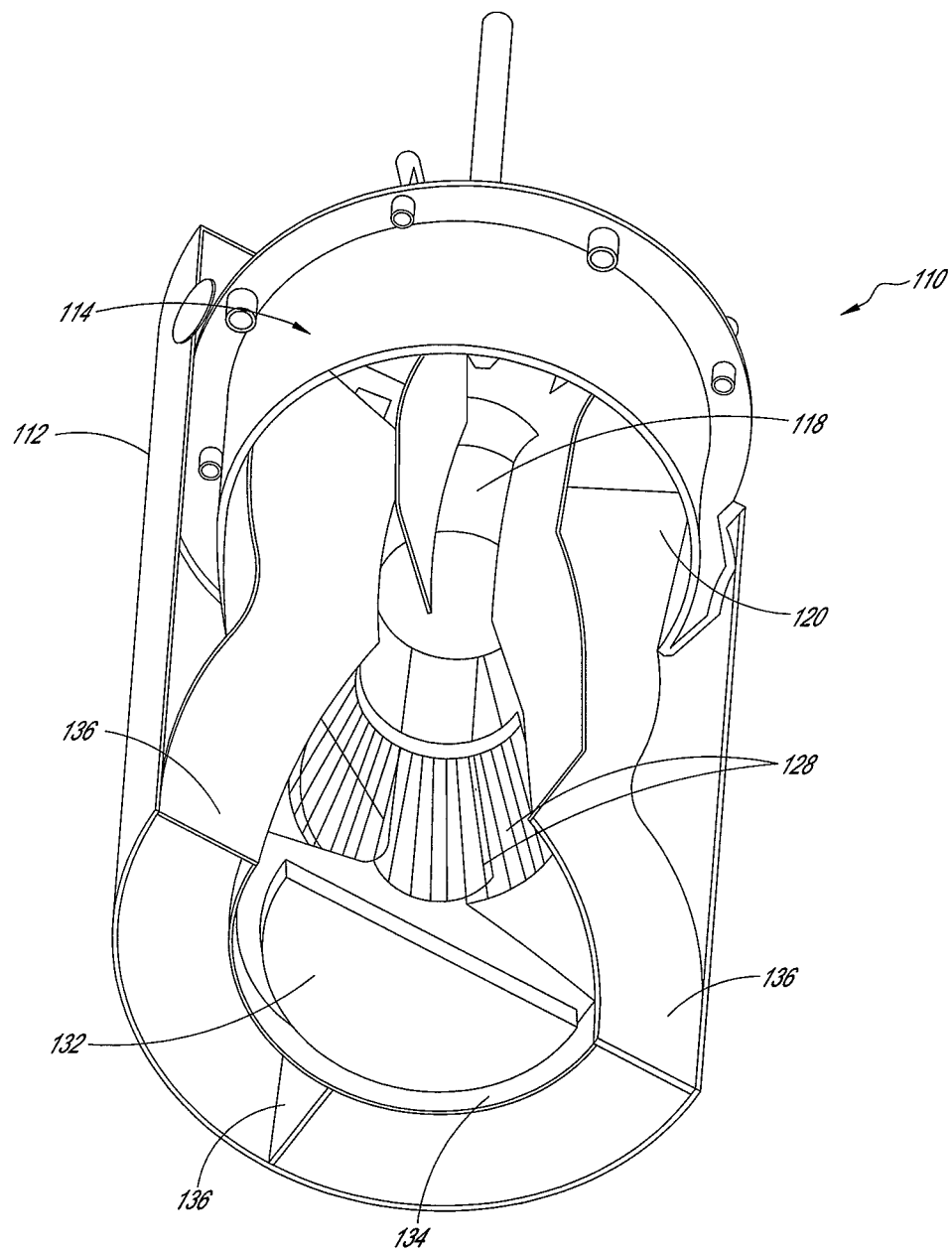
FIG. 14 is a bottom, cross-sectional perspective view of the air moving device of FIG. 13.
Figure 15:
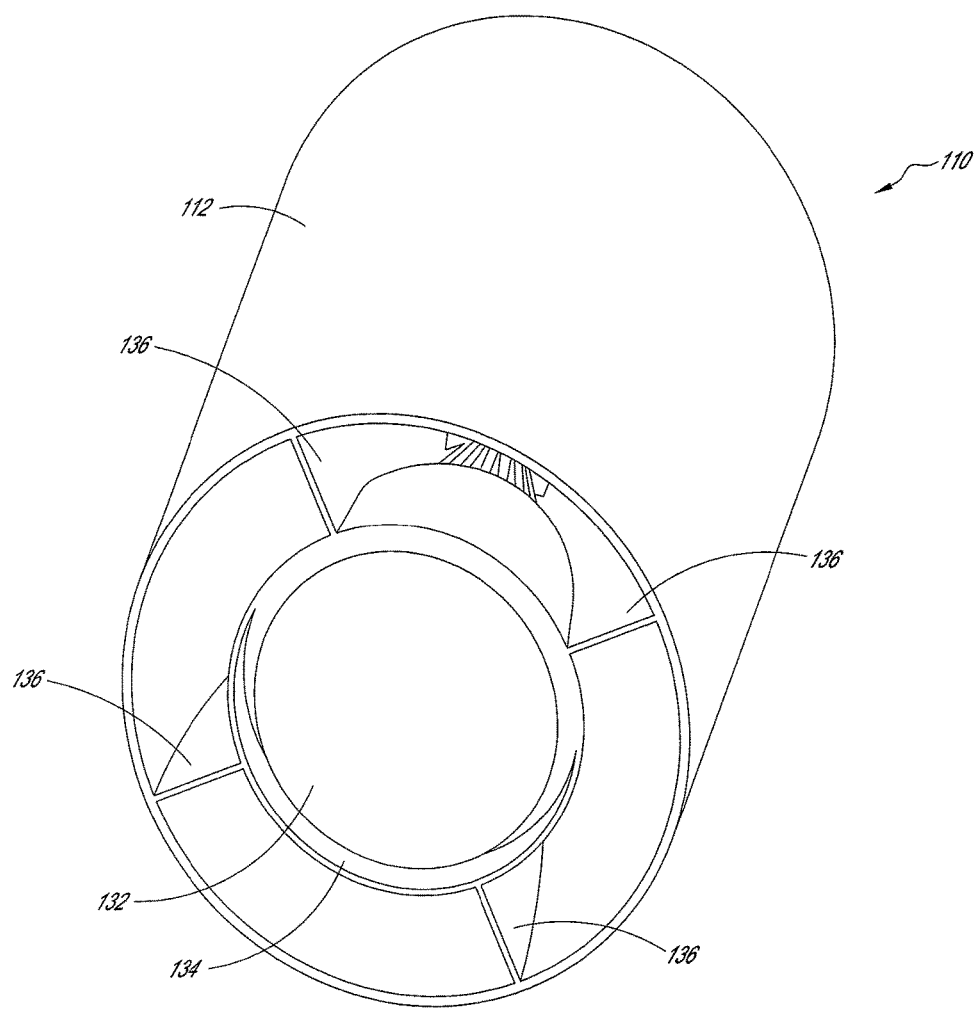
FIG. 15 is a bottom perspective view of the air moving device of FIG. 13.

FIGS. 13-15 illustrate another embodiment of an air moving device 110, one in which the air moving device 110 includes a light source member with a specially designed ability to cool a light source. With reference to FIGS. 13-15, the air moving device 110 can include an outer housing 112. In some embodiments the outer housing 112 can comprise a generally cylindrical structure. In some embodiments the outer housing 112 can extend in an elongate manner vertically once the air moving device 110 is in an installed position.

The air moving device 110 can further comprise a rotary fan assembly 114. The rotary fan assembly 114 can be mounted within the outer housing 112. The rotary fan assembly 114 can comprise an impeller 118 and a plurality of blades 120, similar to the impeller 30 and blades 32 described above. The rotary fan assembly 114 can be configured to direct a volume of air that has entered through a top portion 116 of the air moving device 10 downwardly through a nozzle 121 of the air moving device 10. The top portion 116 can comprise a structure for air intake, for example a cowling, grill, etc., such as the structures described above for the air moving device 10. The rotary fan assembly 114 can push, or force, a volume of air downwardly within an interior space 122 of the air moving device 110. The rotary fan assembly 114 can comprise a motor. For example, the impeller 118 itself can house a motor. The motor can cause the impeller and blades to spin. In some embodiments, the motor can be located elsewhere within the air moving device 110, or located at least partially outside the air moving device 110. The rotary fan assembly 114 can comprise at least one electrical component. The rotary fan assembly can be powered via an electrical power source (e.g. via power cord extending into the top of the device).

The air moving device 110 can further comprise a light source member 124 in the nozzle 121 (e.g. at the bottom of the nozzle 121). The light source member 124 can be similar to the light source member 46 described above. The light source member 124 can comprise a housing 126. The housing 126 can include one or more openings 128. The openings 128 can be in the form of slits extending around a top portion of the housing 126. The openings 128 can permit some of the air that has exited the rotary fan assembly 114 and is traveling through the interior space 122 to enter an inside chamber 130 of the light source member 124. In some embodiments, the inside chamber 130 can have the shape of an hour-glass. For example, as illustrated in FIG. 13, the inside chamber 130 can have a narrowed profile in a middle portion of the chamber 130.

With continued reference to FIGS. 13-15, the light source member 124 can include at least one LED light engine 132, or other source of light. The light engine 132 can be similar to the lens 54 described above. In some embodiments the light engine 132 can comprise a disk-like structure. The light engine 132 can be used to direct light out of the air moving device 110. In some embodiments the light engine can be powered by the same power source that powers the rotor fan assembly 114. A power cord can be extended down through the outer housing 112 and connected to the light engine 132. In some embodiments the power cord can hold the light engine 132 in place. In some embodiments the light engine can be connected to the housing 126 of the light source member 124.

With continued reference to FIGS. 13-15, in some embodiments the air moving device 110 can comprise stator vanes 136 within the interior space 122. The stator vanes 136 can help to guide the air movement through the air moving device 110. The stator vanes 136 can be positioned equidistantly in a circumferential pattern. For example, in some embodiments, four stator vanes 136 can be used. The stator vanes 136 can be used to straighten a volume of air within air moving device 110. The stator vanes 136 can be used to force a volume of air to move in a generally columnar direction downwardly towards the floor of a building or other structure, with minimal lateral dispersion.

In some embodiments, a portion or portions of the housing 112 can be transparent, so as to allow light from the light source member 124 to escape out the sides of the device, and to illuminate areas other than areas directly below the air moving device 110.

With reference to FIG. 13, arrows are illustrated which show air movement throughout the air moving device 110. Air is first brought in through the top 116 of the air moving device 110. The air then travels through the rotary fan assembly 114, where it is directly downwardly in a columnar manner into the interior space 122. The interior space 122 can have a curved profile, as seen in FIG. 13, such that a high pressure area is created around the openings 128 of the housing 126. This high pressure area can help force at least a portion of the air into the housing 126 and chamber 130 of the light source member 124. The chamber 130 can be used to cool the light engine 132. For example, as air is moved through the narrowed (i.e. hour-glass) profile of the chamber 130, the air can enter an expanded profile near the light engine 132. The air can then move directly over the light engine 132, laterally along the light engine 132, and continue on and down along the sides of the light engine 132 and out through the openings 134. Simultaneously, the remainder of the air traveling through the interior space 122 that did not enter the light source member 124 can continue to travel through the interior space 122 and finally out of the air moving device 110, as illustrated by the arrows exiting the bottom of the air moving device in FIG. 13.

Overall, the cooling effect of the chamber 130, and the use of the chamber 130 and openings 128 in the light source member 124, can advantageously reduce the temperature of the light engine 132 so as to avoid overheating. This cooling effect can also reduce the need for additional heat sinks at or near the light engine 132, and can extend the life of a particular light engine, sometimes by thousands of hours. In some embodiments, the light engine 132 can additionally comprise one or more heat sinks. For example, the light engine 132 can comprise a rib or ribs which help to further reduce overheating of the light engine 132.

The de-stratification devices with light source members described above can advantageously be used in all types of structures, including but not limited to residential buildings, as well as large warehouses, hangers, and structures with high ceilings. In contrast, commonly used can light devices that include fans are designed primarily for use in bathrooms, showers, kitchen, and other similar areas. These devices are used for ventilation purposes, or to cool, for example, recessed lighting. These devices often require large amounts of electricity to power both the fan and the light, and are different than the de-stratification device described above.

The air moving device described above advantageously can function both as a means of de-stratification, as well as a means of providing light. Because of the combination of de-stratification and a light source member, the life of the light source member can be improved. This reduces the number of times someone will be required to access the light source member. Because of the high ceilings, accessing the light source member can often be difficult. The access often requires using a riser (e.g. a mechanical lift). This adds extra cost, and requires time that is otherwise saved with a combined de-stratification device and light source member.

Figure 16:
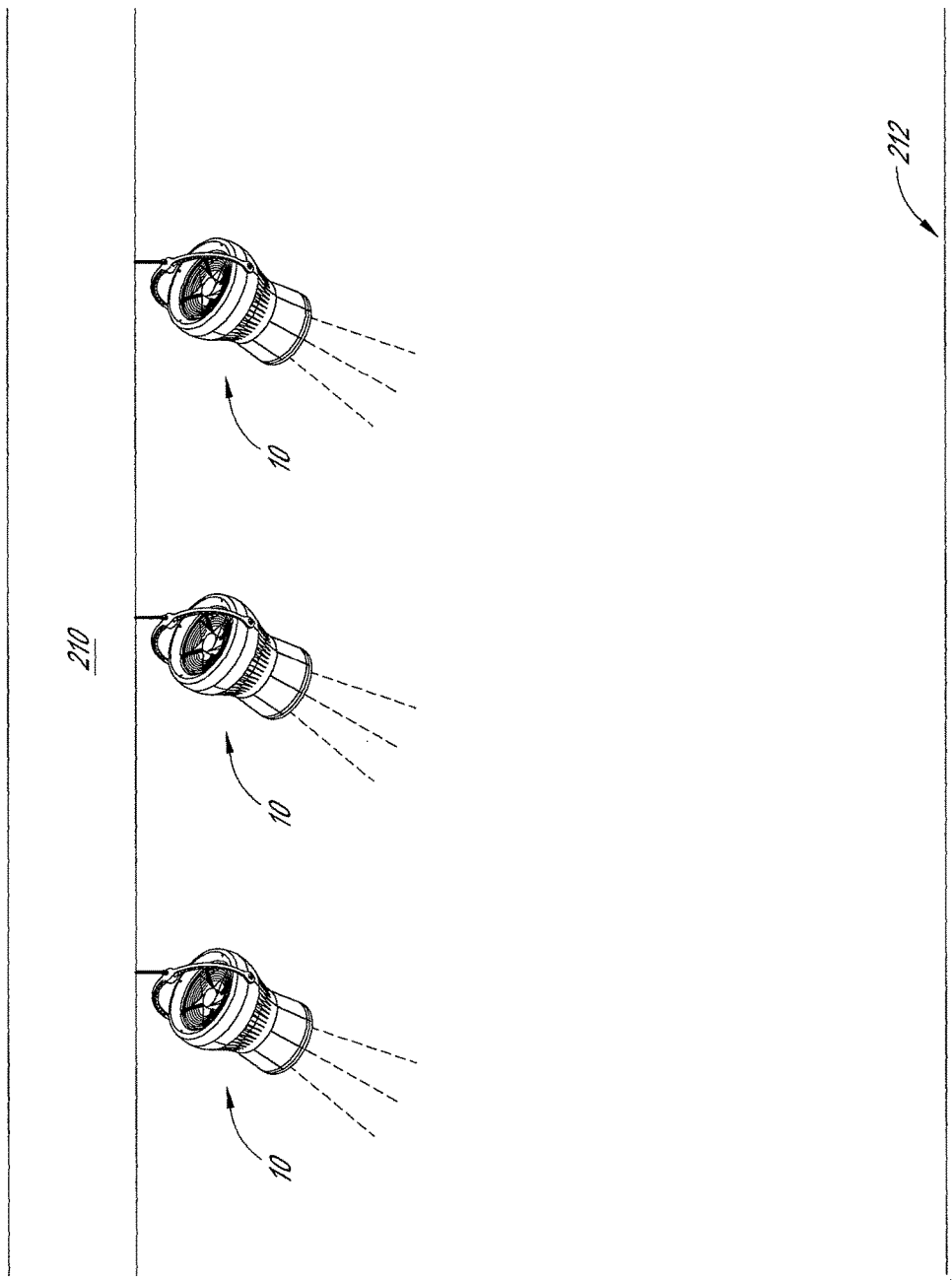
FIG. 16 is a schematic view of cascading air moving devices in a structure.

In some embodiments, more than one air moving device 10, 110 can be used, in a cascading manner, to direct air flow within a structure. For example, and with reference to FIG. 16, in some embodiments a plurality of air moving devices 10, 110 can be spaced apart from one another along a ceiling structure 210 above a floor 212. The air moving devices 10, 110 can be angled, so that columns of exiting air work together to direct and de-stratify and/or move large volumes of air in one direction or another. In some embodiments, air exiting out the bottom of one air moving device 10 can enter the top of another air moving device 10. In some embodiments the ceiling structure 210 can be that of a building, room, or other structure. In some embodiments, the ceiling structure 210 can be that of a subway tunnel, or underground structure, where it may be advantageous to direct large volumes of air, in a cascading manner, so as to move and de-stratify the otherwise stagnant, hot air that often accumulates underground. In embodiments where the air moving device 10 includes a light source member 46, 124, the light source member 46, 124 can also provide additional lighting to an area below.

In some embodiments, rather than using a plurality of air moving devices 10, 110 in a ceiling structure 210, the air moving device 10, 110 can be mounted to outside structures, and the columns of air can be used to cool an outside area. For example, a plurality of air moving devices 10, 110 can be arranged in a cascading manner such that the devices 10, 110 work together to help cool people that are standing outside below the air moving devices 10, 110. Sometimes people are required to stand in long lines outdoors during hot times of the year. By arranging a plurality of air moving devices 10, 110 near the long lines, the people in line can be kept cool and comfortable, and at night can be blanketed with light if desired. In embodiments where the air moving device 10, 110 includes a light source member 46, 124 the light source member 46, 124 can also provide additional lighting to an area below.

In some embodiments, the cascading system can be operated so that the air moving devices 10, 110 do not all function at the same time. For example, in some embodiments some of the air moving devices 10, 110 can be shut off. In some embodiments the air moving devices 10, 110 can be turned on one after another, moving along a row of cascading devices 10, 110 as needed, to move the air in a large air space. In some embodiments the cascading system of air devices 10, 110 can be operated wirelessly with a wireless control system.

Figure 17:
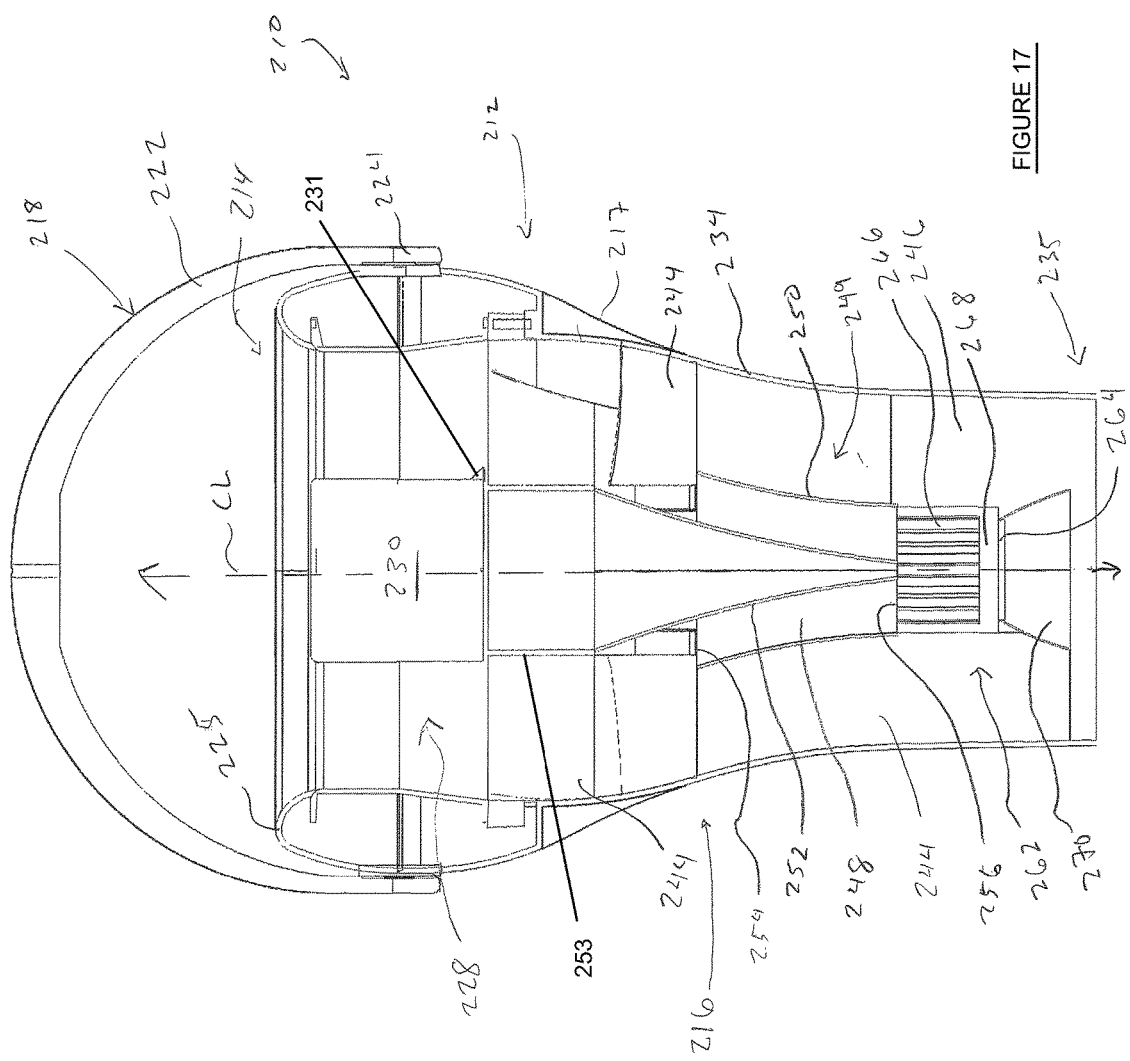
FIG. 17 is a front cross-sectional plan view of an air moving device according to an embodiment.
Figure 18:
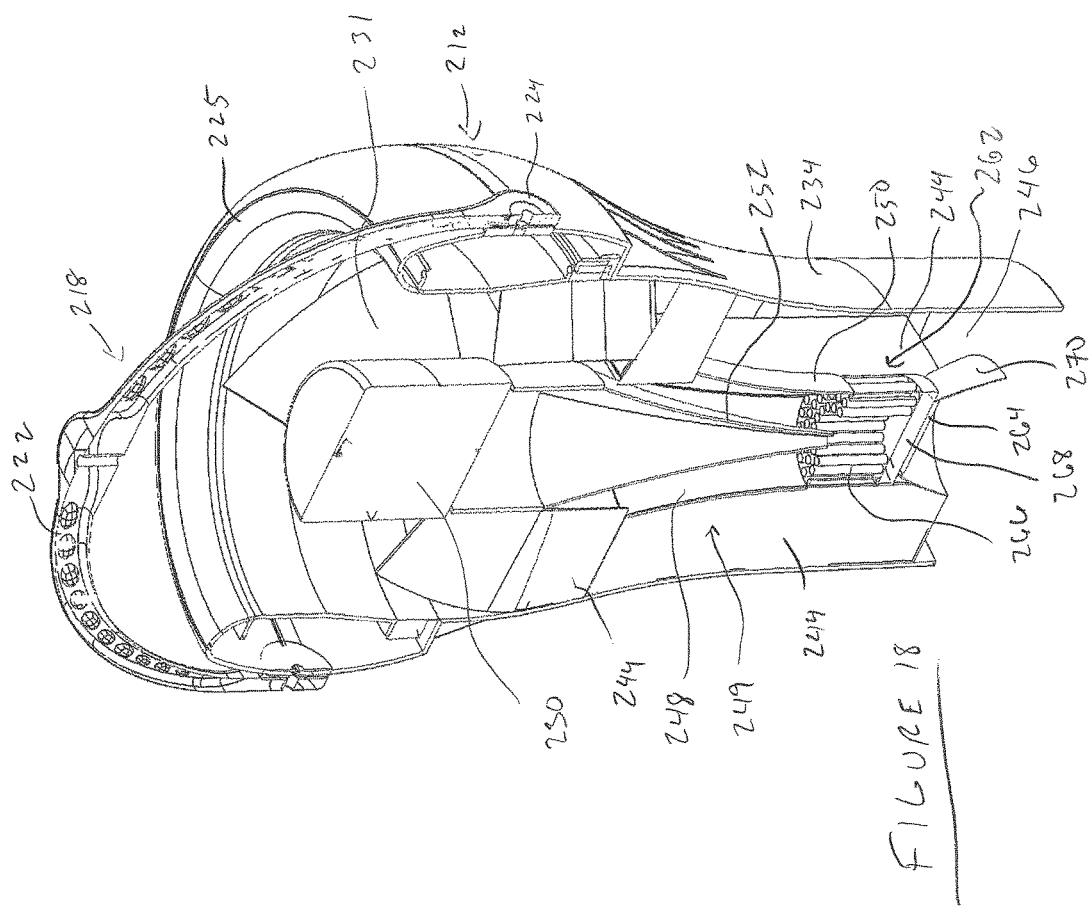
FIG. 18 is a front, perspective cross-sectional view of the air moving device of FIG. 17.

FIGS. 17 and 18 illustrate an embodiment of an air moving device 210. The air moving device 210 can include a housing 212. The housing 212 can have a first end 214 and a second end 216. The housing 212 can have a generally cylindrical shape, frustoconical shape, conical shape, and/or some other shape or combination of shapes. The housing 212 can have an interior space. The interior space of the housing 212 can extend from the first end 214 to the second end of the housing 216. The air moving device 210 can include one or more ribs 217 extending between an upper portion of the housing 212 and a lower portion of the housing 212.

In some embodiments, a nozzle 234 is connected to (e.g., via welding, adhesives, fasteners, co-molding, or otherwise) the housing 216. For example, the nozzle 234 can have a connection end configured to connect to the second end 216 of the housing 212. In some embodiments, the nozzle 234 and housing 216 are formed as a monolithic part. An outlet end 235 of the nozzle 234 can define an outlet of the air moving device 210.

As illustrated, the air moving device 210 can include a rotary fan assembly 228. The rotary fan assembly 228 can be mounted at least partially within the interior space of the housing 212. For example, the rotary fan assembly 228 can be mounted in the interior space of the housing 212 adjacent (e.g. at or near) the first end 214 of the housing 212.

The rotary fan assembly 228 can include an impeller 230. The impeller 230 can have one or more impeller blades 231. The rotary fan assembly 238, via the impeller 230 and impeller blades 231, can be configured to move a volume of air from the inlet 214 of the housing 212 toward the outlet of the housing 212 and/or the outlet 235 of the nozzle. A motor can be positioned within or near the impeller 230 to drive rotation of the impeller 230 and impeller blades 231.

In some embodiments, the air moving device 210 include one or more flow-straightening structures. For example, the air moving device 210 can include one or more stator vanes 244. The stator vanes 244 can be positioned within the interior of the housing 212 and/or within an interior of the nozzle 234. As illustrated, the stator vanes 244 can be distributed in a circumferential pattern within the interior of the air moving device 210. In some embodiments, the stator vanes 244 include one or more curved portions. For example, the ends of the stator vanes 244 nearest the impeller 230 can be curved in the circumferential direction opposite the direction of rotation of the impeller 230. The stator vanes 244 can straighten (e.g., in a direction toward the outlet end 235 of the nozzle 234) the flow of air through the nozzle 234 and/or through housing 212 after the air leaves the impeller 230. In some embodiments, the stator vanes 244 straighten the flow of air to direct a generally columnar (e.g., with reduced lateral dispersion) flow of air out of the outlet 235 of the nozzle 234.

In some embodiments, the air moving device 210 can include a support member 218. The support member 218 can be connected to the housing 212 via a ratcheting hinge 224 or other mechanical connection (e.g., a hinge). In some embodiments, the support member 218 includes a generally arched structure 222. The generally arched structure 222 can be used to facilitate connecting the air moving device 210 to a support structure (e.g., a ceiling or some portion thereof, a wall, or some other support structure).

The housing 212, nozzle 234, rotary fan assembly 228, stator vanes 244, and/or support member 218 can be the same as or similar to the components of the air moving devices disclosed in U.S. Pat. No. 7,381,129, which was incorporated by reference above in its entirety.

As illustrated, the air moving device 210 can include a bypass assembly 249. The bypass assembly 249 can be positioned at least partially within the interior of the air moving device 210 between the impeller 230 and the nozzle outlet 235. The bypass assembly 249 can include a first bypass member 250. The first bypass member 250 can be, for example, a wall (e.g., an annular wall) positioned within the interior of the air moving device 210. The first bypass member 250 can have a generally conical shape, a frustoconical shape, a cylindrical shape, and/or some other shape or combination of shapes. The first bypass member 250 can define a bypass flow path 248 through which a portion of the volume of air moved through the air moving device 210 can pass. The bypass flow path 248 can have a bypass inlet 254 located on an end of the bypass flow path 248 closest to the impeller 230. A bypass outlet 256 can be located on an end of the bypass flow path 248 furthest from the impeller 230.

A diameter or other cross-sectional dimension of at least a portion of the first bypass member 250 can be tapered between the bypass inlet 254 to the bypass outlet 256 to accelerate bypass air flow through the bypass flow path 248.

The first bypass member 250 can be supported in the air moving device 210 by one or more braces, struts, or other support structures. In some embodiments, the first bypass member 250 is supported within the interior space of the air moving device 210 at least in part by the vanes 244. For example, as illustrated in FIG. 17, a portion of at least one of the vanes 244 can overhang the bypass inlet 254 to inhibit or prevent movement of the first bypass member 250 toward the impeller 230. Interaction between a tapered portion of the bypass member 250 and an inner edge of the vanes 244 can inhibit or prevent movement of the bypass member 250 away from the impeller 230. In some embodiments, the first bypass member 250 is free to rotate (e.g., about a centerline CL of the air moving device 210) within the air moving device 210. In some embodiments, the first bypass member 250 is rotationally fixed within the air moving device 210 via adhesives, welding, fasteners, or otherwise.

The bypass assembly 249 can include a second bypass member 252. The second bypass member 252 can be positioned at least partially within the first bypass member 250. In some embodiments, the second bypass member 252 extends further toward the impeller 230 than the first bypass member 250. The second bypass member 252 can be a wall (e.g., an annular wall) positioned at least partially within the first bypass member 250. The second bypass member 252 can have a generally conical shape, a frustoconical shape, a cylindrical shape, and/or some other shape or combination of shapes. As illustrated, the second bypass member 252 can define a radially inner wall (e.g., with respect to the centerline CL of the air moving device 210) of the bypass channel 248. In some embodiments, use of the second bypass member 252 to form an inner wall of the bypass channel 248 can reduce turbulence within the bypass channel 248. For example, the second bypass member 252 can be connected to an inner wall 253 of the interior space of the air moving device 210 to form a continuous or partially continuous inner boundary for air moving through the air moving device 210 from the impeller toward the outlet 235. Forming a continuous or partially continuous inner boundary for the air flow can reduce the number of sharp corners and/or blunt obstacles in the air flow path. The second bypass member 252 can be supported within the air moving device 210 by the rotary fan assembly 228 and/or by one or more of the stator vanes 244.

As illustrated in FIGS. 17 and 18, the air moving device 210 can include a light assembly 262. The light assembly 262 can be positioned at least partially within the interior of the air moving device 210. For example, the light assembly 262 can be positioned between the bypass assembly 249 and the outlet 235 of the nozzle 234. The light assembly 262 can be supported in the air moving device 210 by struts, braces, and/or other support structures. In some embodiments, the light assembly 262 is supported by the stator vanes 244. For example, the radially-inward edges of the stator vanes 244 can be shaped (e.g., cut-outs in the stator vanes can be formed) to match the radial profile of all or part of the light assembly 262.

The light assembly 262 can include one or more light units 264. The light units 264 can include, without limitation, LEDs, incandescent bulbs, fluorescent bulbs, neon lights, and/or other light-emitting elements. Preferably, the light unit 264 comprises at least one LED having a diameter of 1 inch, 2 inches, 3 inches, 5 inches, 7 inches, 10 inches, or some value therebetween. In some embodiments, the light unit 264 can have a diameter or other cross-section dimension that is less than about 70%, less than about 60%, less than about 50%, less than about 40%, less than about 30%, less than about 20%, less than about 10%, or less than 5% of the diameter of the nozzle outlet 235. In some embodiments, the light unit 264 has a diameter that is less than about 35% of the diameter of the nozzle outlet 235.

The light unit 264 can be mounted to a light support 268. The light support 268 can include a circuit board or other power transmitting structure to facilitate actuation (e.g., turning on) of the light unit 264. In some embodiments, the light support unit 268 is constructed from a conductive and/or semi-conductive material.

As illustrated, the light assembly 262 can include one or more heat sinks 266. The heat sinks 266 can be connected to the light support unit 268 and/or to the light unit 264. The heat sinks 266 are preferably constructed from a conductive and/or semi-conductive material to facilitate heat transfer from the light unit 262. In some embodiments, the light unit 262 includes a plurality of desirably elongate heat sinks 266 desirably spaced from one another positioned between the light unit 264 and the bypass assembly 249, which are desirably mounted so the length of the heat sinks extend upwards away from the light unit and air flows over the heat sinks, providing increased surface area for the transfer of heat.

The light assembly 262 can include an optical component 270 (e.g., a lens, a shade, a lamp, and/or some other optical component). The optical component 270 can be connected to the light unit 264 and/or to the light support 268. In some embodiments, the optical component 270 is positioned at least partially within the interior of the air moving device 210 between the light unit 264 and the outlet 235 of the nozzle 234.

As illustrated, the bypass channel 248 can direct a portion of the volume of air moving through the air moving device 210 to impinge on the light assembly 262. For example, the bypass air can be directed to flow over the heat sinks 266 and/or light unit 262 to cool the light unit 262. Airflow over the heat sinks 266 and/or light unit 262 can inhibit or prevent overheating of the light unit 262 and can increase the life of the light unit 262. The remaining airflow that does not enter the bypass channel 248 can exit the nozzle outlet 235 in a generally columnar fashion via the main flow outlet path 246.

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combinations or sub-combinations of the specific features and aspects of the embodiments can be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An air moving device comprising:
   a housing having a first end and a second end;
   an impeller rotatably mounted within the housing adjacent the first end of the housing, the impeller having one or more rotor blades capable of directing a volume of air toward the second end of the housing;
   a nozzle having a connection end and an outlet end, the connection end of the nozzle connected to the second end of the housing, the nozzle and the housing forming an interior of the air moving device;
   a first bypass wall mounted between the impeller and the outlet end of the nozzle in the interior of the air moving device, an interior surface of the first bypass wall forming a bypass flow channel, the first bypass wall directing a bypass portion of the volume of air through the bypass flow channel toward the outlet end of the nozzle;
   a second bypass wall mounted in the interior of the air moving device between the impeller and the outlet end of the nozzle;
   one or more stator vanes positioned within the interior of the air moving device between the impeller and the outlet end of the nozzle, the one or more stator vanes configured to direct the volume of air out from the outlet end of the nozzle in a generally columnar manner;
   a light unit mounted within the interior of the air moving device; and
   a heat sink connected to the light unit and positioned at least partially within the interior of the air moving device such that some or all of the bypass portion of the volume of air passes over the heat sink.

2. The air moving device of claim 1, wherein the bypass flow channel is defined by the interior surface of the first bypass wall and an exterior surface of the second bypass wall.

3. The air moving device of claim 1, wherein the second bypass wall has a generally conical shape.

4. The air moving device of claim 1, wherein the second bypass wall is mounted at least partially within a volume defined by the first bypass wall.

5. The air moving device of claim 1, wherein the second bypass wall is mounted coaxially with the first bypass wall.

6. The air moving device of claim 1, wherein a first end of the second bypass wall is mounted to an inner wall of the interior of the air moving device and forms a continuous interior wall therewith between the impeller and an inlet to the bypass flow channel.

7. The air moving device of claim 1, further comprising a support member connected to the housing, the support member capable of mounting the air moving device to a mounting structure.

8. The air moving device of claim 7, wherein the mounting structure is a ceiling of an enclosure.

9. The air moving device of claim 1, wherein the light unit comprises one or more LED light engines.

10. The air moving device of claim 1, wherein the heat sink comprises a plurality of elongate conductive members.

11. The air moving device of claim 1, further comprising a lamp positioned between the light unit and the outlet end of the nozzle.

12. An air moving device for de-stratifying air within an enclosure, the air moving device comprising:
    a housing defining an interior of the air moving device and having an inlet and an outlet, a diameter of the outlet being less than a diameter of the inlet;
    a rotary fan mounted within the interior of the air moving device and capable of directing a volume of air from the inlet toward the outlet;
    an annular bypass member having an inner wall and an outer wall, the bypass member mounted between the rotary fan and the outlet, an interior of the bypass member defining a bypass channel through which a bypass portion of the volume of air is directed;
    one or more vanes positioned within the interior of the air moving device between the impeller and the outlet end of the nozzle, the one or more vanes configured to direct the volume of air out from the outlet end of the nozzle in a generally columnar manner;
    a light unit mounted within the interior of the air moving device between the bypass member and the outlet; and
    a conductive member connected to the light unit and positioned at least partially within the interior of the air moving device such that some or all of the bypass portion of the volume of air passes over the conductive member.

13. The air moving device of claim 12, wherein the inlet of the housing includes cowling.

14. The air moving device of claim 12, wherein a motor is mounted within the rotary fan to rotate the rotary fan.

15. The air moving device of claim 12, wherein the conductive member conducts heat from the light unit when the light unit is in an illuminating configuration.

16. The air moving device of claim 12, wherein a diameter of the light unit is less than 35% of the diameter of the outlet of the housing.

17. The air moving device of claim 12, the one or more vanes include a cut-out portion shaped to match an outer profile of at least a portion of the light unit.

18. The air moving device of claim 12, wherein the one or more vanes are positioned between the light unit and an interior wall of the housing.

19. The air moving device of claim 12, wherein one or more of the vanes includes an inner edge sized and shaped to match an outer edge of the light unit when the light unit is mounted in the interior of the air moving device.

20. The air moving device of claim 12, further comprising one or more ribs connecting a first portion of the housing to a second portion of the housing.

* * * * *